(12) United States Patent
Hamanaka et al.

(10) Patent No.: US 9,217,677 B2
(45) Date of Patent: Dec. 22, 2015

(54) TEMPERATURE MEASURING APPARATUS WITH SENSOR ASSEMBLY OF SENSING DEVICES CONNECTED TOGETHER

(71) Applicant: DENSO CORPORATION, Kariya, Aichi-pref., PA (US)

(72) Inventors: Yoshiyuki Hamanaka, Kariya (JP); Tsuneo Maebara, Nagoya (JP)

(73) Assignee: DENSO CORPORATION, Kariya (JP)

( * ) Notice: Subject to any disclaimer, the term of this patent is extended or adjusted under 35 U.S.C. 154(b) by 370 days.

(21) Appl. No.: 13/945,966

(22) Filed: Jul. 19, 2013

(65) Prior Publication Data
US 2014/0023110 A1 Jan. 23, 2014

(30) Foreign Application Priority Data
Jul. 20, 2012 (JP) .................. 2012-161496

(51) Int. Cl.
*G01K 7/01* (2006.01)
*G01K 15/00* (2006.01)
*G01K 13/00* (2006.01)
*G01K 1/02* (2006.01)

(52) U.S. Cl.
CPC ............ *G01K 13/00* (2013.01); *G01K 1/026* (2013.01); *G01K 7/01* (2013.01)

(58) Field of Classification Search
USPC ....................... 374/178, 166, 45, 1
See application file for complete search history.

(56) References Cited

U.S. PATENT DOCUMENTS

| | | | | |
|---|---|---|---|---|
| 2006/0056486 A1* | 3/2006 | Mikuni | .................... | G01K 7/01 374/178 |
| 2008/0031304 A1* | 2/2008 | Nishimura | ............. | G01K 7/015 374/178 |
| 2008/0238529 A1* | 10/2008 | Kumagai | ................. | G01K 7/01 327/512 |
| 2011/0122917 A1* | 5/2011 | Hamanaka | ............... | G01K 7/01 374/170 |
| 2012/0217906 A1* | 8/2012 | Hamanaka | ............. | B60L 3/003 318/139 |
| 2013/0181749 A1* | 7/2013 | Hamanaka | ............. | H03K 17/56 327/109 |
| 2014/0019816 A1* | 1/2014 | Hamanaka | ............. | H04L 1/206 714/709 |

FOREIGN PATENT DOCUMENTS

| | | |
|---|---|---|
| JP | 07-074550 | 3/1995 |
| JP | 07-301545 | 11/1995 |
| JP | 2003-289124 | 10/2003 |
| JP | 2009-171312 | 7/2009 |
| JP | 2011-027625 | 2/2011 |
| JP | 2011-167039 | 8/2011 |

\* cited by examiner

*Primary Examiner* — Mirellys Jagan
(74) *Attorney, Agent, or Firm* — Nixon & Vanderhye PC

(57) ABSTRACT

A temperature measuring apparatus is provided which includes a sensor assembly made up of sensing devices which are connected together to produce an output signal correlated with the temperature of a target object. The temperature measuring apparatus determines the number of the sensing devices of the sensor assembly and corrects the output signal so as to compensate for an error in determining the temperature of the target object which depends upon the number of the sensing devices.

19 Claims, 21 Drawing Sheets

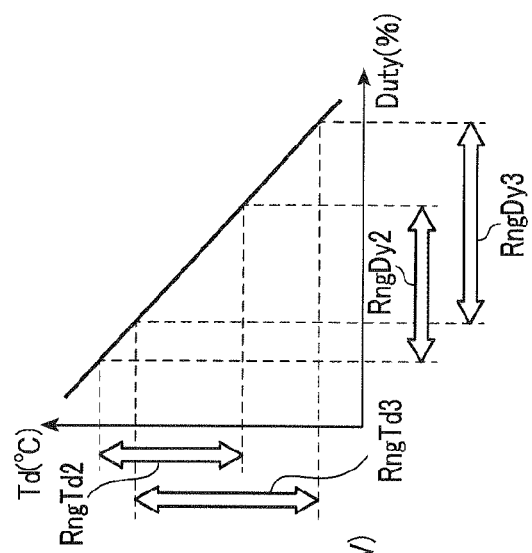
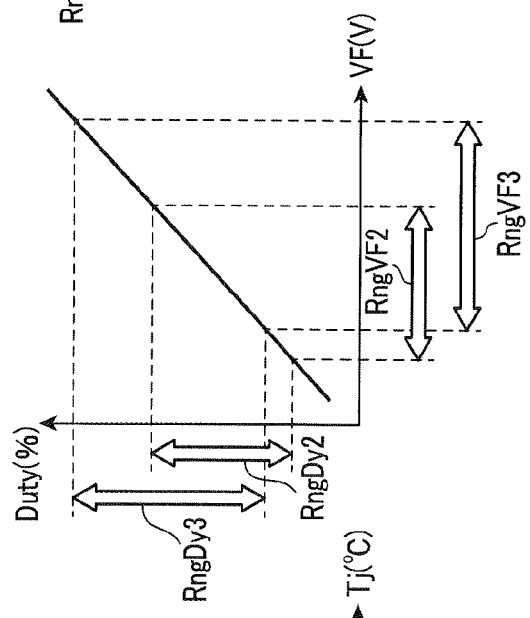
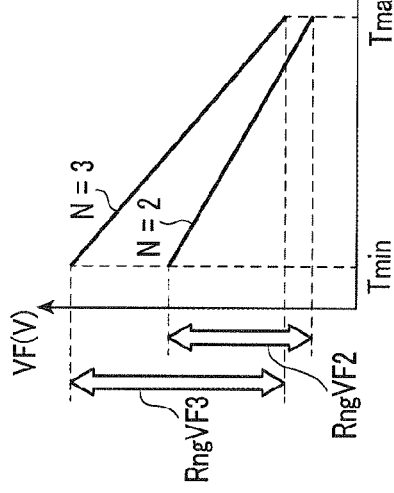

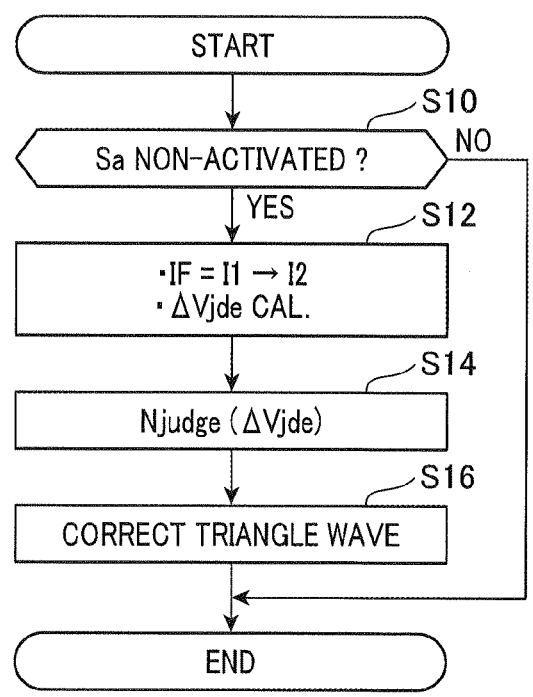

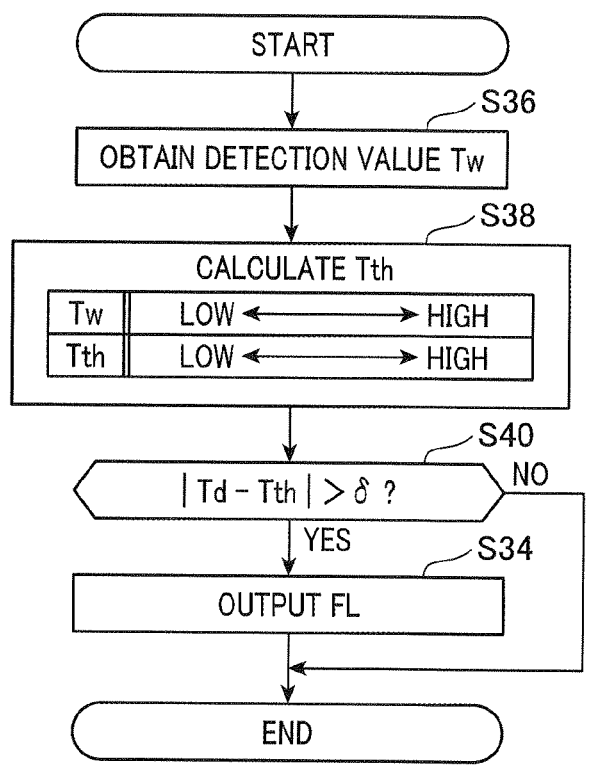

TEMPERATURE MEASURING APPARATUS WITH SENSOR ASSEMBLY OF SENSING DEVICES CONNECTED TOGETHER

CROSS REFERENCE TO RELATED DOCUMENT

The present application claims the benefit of priority of Japanese Patent Application No. 2012-161496 filed on Jul. 20, 2012, the disclosure of which is incorporated herein by reference.

BACKGROUND OF THE INVENTION

1. Technical Field

This disclosure relates generally to a temperature measuring apparatus equipped with a sensor assembly made up of sensing devices which outputs a signal correlating with the temperature of a target object and a temperature determiner which analyzes the output from the sensor assembly to determine the temperature of the target object.

2. Background Art

Japanese Patent First Publication No. 2009-171312, assigned to the same assignee as this application, teaches a temperature measuring apparatus which is equipped with a set of temperature-sensitive diodes connected together which outputs a signal correlating with temperatures of a target object (e.g., a semiconductor switching device), a modulation circuit which modulates the output from the set of the temperature-sensitive diode into a pulse signal, and a microcomputer which analyzes the pulse signal to determine the temperature of the target object.

The number of the temperature-sensitive diodes connected together depends upon specifications of the temperature measuring apparatus. An increase in number of the temperature-sensitive diodes results in an increased level (i.e., a voltage drop) of the output from the set of the temperature-sensitive diodes representing an actual temperature of the target object. Therefore, when the temperature measuring apparatus does not pre-store information about the number of the temperature-sensitive diodes in a microcomputer, that is, is not designed to match the number of the temperature-sensitive diodes installed therein, it may result in a decrease in accuracy of determining the temperature of the target object using the pulse signal, as described above.

Temperature measuring apparatuses equipped with a set of sensing devices which are different in type from the temperature-sensitive diodes and are engineered to produce an output correlating with temperatures of a target object also encounter the above problem.

SUMMARY

It is therefore an object to provide an improved structure of a temperature measuring apparatus designed to ensure the stability of accuracy in determining the temperature of a target object.

According to one aspect of an embodiment, there is provided a temperature measuring apparatus which comprises: (a) a sensor assembly made up of sensing devices which are connected together, the sensor assembly working to produce an output signal correlated with a temperature of a target object; (b) a temperature determiner which determines the temperature of the target object based on temperature information, as represented by the output signal from the sensor assembly; (c) determining means for determining a number of the sensing devices of the sensor assembly; and (d) correcting means for correcting the temperature information, as used in determining the temperature of the target object, so as to compensate for an error in determining the temperature of the target object. The error depends upon the number of the sensing devices.

Specifically, the temperature information, as used in determining the temperature of the target object, is corrected for matching the number of the sensing devices constituting the sensor assembly, thus ensuring the accuracy in determining the temperature of the target object.

In the preferred mode of an embodiment, the temperature measuring apparatus also includes a modulator which modulates the output signal from the sensor assembly into a pulse signal which holds the temperature information to be corrected by the correcting means.

The temperature measuring apparatus also includes a constant-current power source which applies a constant current to the sensor assembly. The determining means analyzes the output signal from the sensor assembly in response to the constant current, as applied by the constant-current power source, to determine the number of the sensing devices of the sensor assembly. The output signal from the sensor assembly is used as a parameter to determine the number of the sensing devices based on the fact that the greater the number of the sensing devices, the greater the level of the output signal, as produced when the constant current flows the sensor assembly.

The constant-current power source is designed to variably produce the constant current. The constant-current power source changes a value of the constant current to create a change in the output signal from the sensor assembly. The determining means determines the number of the sensing devices of the sensor assembly based on the change in the output signal. The change in output signal from the sensor assembly is used as a parameter to determine the number of the sensing devices based on the fact that the greater the number of the sensing devices, the greater the change in the output signal. The change is independent from the temperature of the target object, but completely depends upon the number of the sensing devices.

The determining means may be engineered to acquire an external signal carrying information about the number of the sensing devices. The determining means may determine the number of the sensing devices based on the acquired signal.

The temperature measuring apparatus may alternatively be designed to have a temperature sensor which measures a temperature of a second target object correlated with the temperature of the target object and produces a signal indicative thereof. The determining means determines the number of the sensing devices based on the signal outputted from the temperature sensor and the output signal from the sensor assembly. The greater the number of the sensing devices, the greater will be the level of the output signal from the sensor assembly. Additionally, the signal, as produced by the temperature sensor, bears a relation to the output signal from the sensor assembly. Based on such facts, the signal outputted from the temperature sensor and the output signal from the sensor assembly are used as parameters to determine the number of the sensing devices.

The determining means may be designed to derive an output from one of the sensing devices of the sensor assembly. The determining means may determine the number of the sensing devices based on the output signal from the sensor assembly and the output from the one of the sensing devices. This enhances the accuracy in determining the number of the sensing devices.

Each of the sensing devices of the sensor assembly is a temperature-sensitive diode. The temperature measuring apparatus may also include voltage applying means for variably applying voltage to the sensor assembly. The determining means may determine the number of the sensing devices based on a value of the voltage, as applied by the voltage applying means, at a time when the temperature-sensitive diode are turned on. The use of such a voltage enhances the accuracy in determining the number of the sensing devices.

The temperature measuring apparatus may also include a first system which includes the target object, the sensor assembly, the modulator, the determining means, and the correcting means, a second system which is electrically insulated from the first system and includes outputting means for outputting a signal which carries information about the number of the sensing devices, and an insulating transmitter working to establish transmission of the signal, as outputted from the outputting means, from the second system to the first system while electrically insulating between the first and second systems. The determining means may determine the number of the sensing devices based on the signal, as transmitted from the outputting means through the insulating transmitter. The use of the signal produced by the outputting means improves the accuracy in determining the number of the sensing devices.

The target object to be measured in temperature thereof may be a switching device. The insulating transmitter is designed to transmit both a drive signal to the switching device and the signal, as outputted from the outputting means.

The insulating transmitter may establish the transmission of the signal through serial communication.

The modulator may work to compare between levels of the output signal from the sensor assembly and a carrier to pulse-width-modulate the output signal to produce the pulse signal.

The temperature determiner determines the temperature of the target object using characteristic information and a duty cycle of the pulse signal, as produced by the modulator. The characteristic information represents a relation of a value of the temperature of the target object to a value of the duty cycle of the pulse signal to be produced by the modulator when the number of the sensing devices of the sensor assembly is set to a given value. The correcting means corrects an amplitude of the carrier to bring a value of the duty cycle of the pulse signal, as produced by the modulator, into agreement with a value of the duty cycle expected to be provided when the number of the sensing devices of the sensor assembly is the given value.

The correcting means may bring a characteristic of the pulse signal, as inputted from the modulator into the temperature determiner, into agreement with a characteristic of the pulse signal expected to be provided when the number of the sensing devices of the sensor assembly is the given value to correct the temperature information based on the number of the sensing devices, as determined by the determining means.

The temperature measuring apparatus may also include a second sensor assembly made up of sensing devices which are connected together. The second sensor assembly works to produce an output signal correlated with a temperature of a second target object. The number of the sensing device of the sensor assembly is identical with that of the sensing device of the second sensor assembly. The determining means determines the number of the sensing devices of either of the sensor assembly or the second sensor assembly.

In the case where the target object is a switching device, the determining means determines the number of the sensing devices of the sensor assembly before the switching device is actuated.

The temperature measuring apparatus may also include a second sensor assembly made up of sensing devices which are connected together. The second sensor assembly works to produce an output signal correlated with a temperature of a second switching device connected in parallel to the first switching device. The temperature measuring apparatus may also include diagnosing means for diagnosing operations of a first sensor assembly that is said sensor assembly and the second sensor assembly. When an absolute value of a difference in temperature between the first and second switching devices is greater than a given value, the diagnosing means determines that a malfunction associated with either of the first and second sensor assemblies is occurring.

The target object may be a first switching device. The temperature measuring apparatus may also include a second sensor assembly made up of sensing devices which are connected together. The second sensor assembly works to produce an output signal correlated with a temperature of a second switching device. The first switching device and the second switching device may be connected in series with each other as a low potential side switching device and a high potential side switching device to constitute an electric power convertor. The temperature measuring apparatus may also include diagnosing means for diagnosing operations of a first sensor assembly that is said sensor assembly and the second sensor assembly. When an absolute value of a difference in temperature between the low potential side switching device and the high potential side switching device is greater than a given value, the diagnosing means determines that a malfunction associated with either of the first and second sensor assemblies is occurring.

The temperature measuring apparatus may alternatively be designed to have a temperature sensor which measures a temperature of a second target object correlated with the temperature of the target object and produces a signal indicative thereof. The diagnosing means determining that a malfunction associated with the sensor assemblies is occurring based on a signal produced by the temperature sensor and the output signal from the sensor assembly.

The temperature measuring apparatus may also include warning means for warning of the malfunction.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 3A is a view which represents a relation between an actual temperature of a switching device and an output signal from a temperature-sensitive diode assembly;

FIG. 3B is a view which represents a relation between an output signal from a temperature-sensitive diode assembly and a duty cycle of an output signal from a PWM comparator;

FIG. 3C is a view which illustrates a temperature map for use in a temperature determining operation;

FIG. 4 is a flowchart of a sequence of logical steps to perform determination and correcting operations in the temperature measuring apparatus of FIG. 2;

FIG. 23 is a flowchart of a diagnosis program to monitor a malfunction of a temperature-sensitive diodes according to the eleventh embodiment.

DESCRIPTION OF THE PREFERRED EMBODIMENTS

Figure 1:
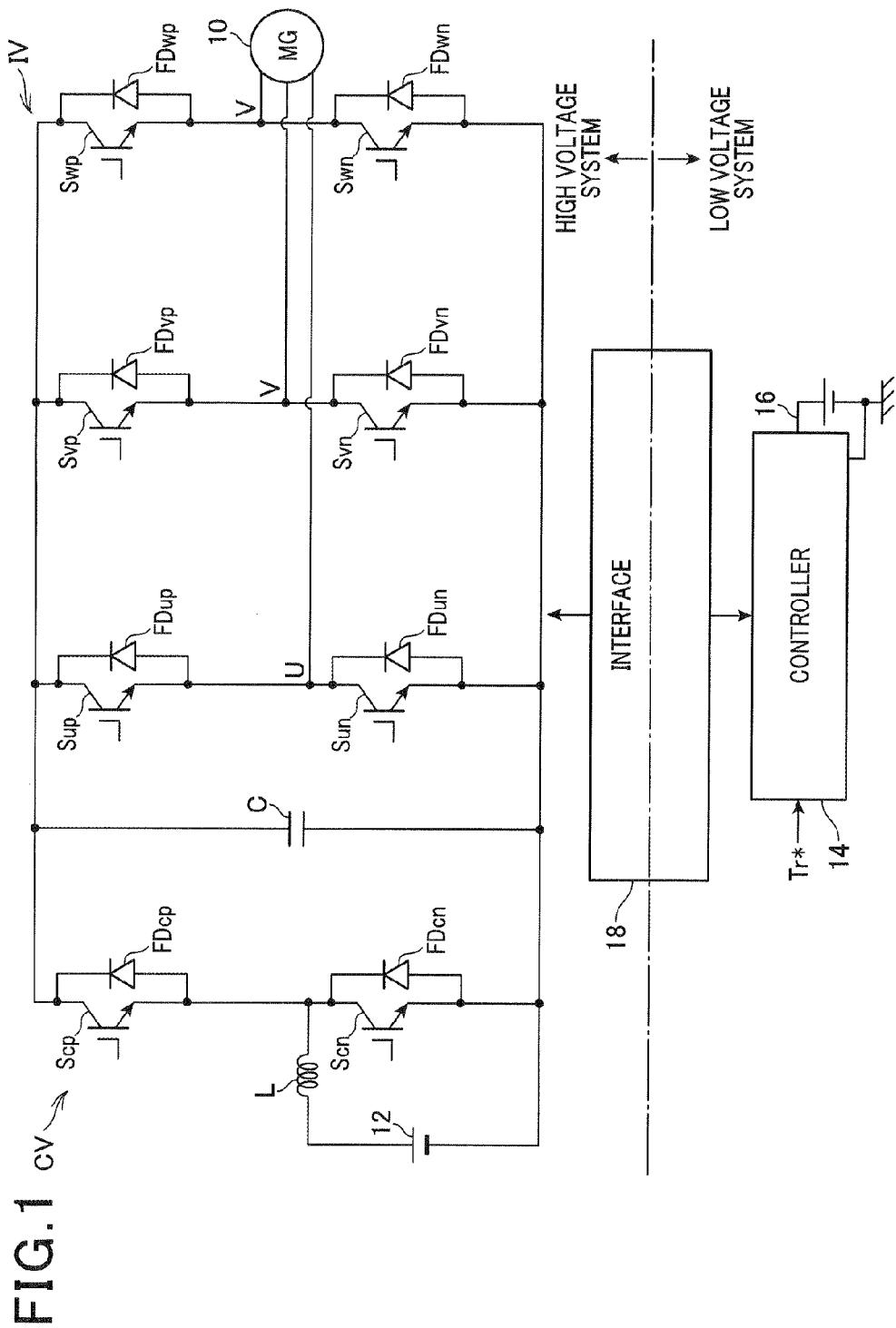
FIG. 1 is a circuit diagram which illustrates a control system equipped with a temperature measuring apparatus according to the first embodiment.

Referring to the drawings, wherein like reference numbers refer to like parts in several views, particularly to FIG. 1, there is shown a control system in which a temperature measuring apparatus of a first embodiment is installed and which is mounted in a vehicle such as an electric automobile or a hybrid automobile equipped with an electric rotating machine working as a main drive source. Specifically, the control system works as a drive power control system for the vehicle.

FIG. 1 illustrates an overall structure of the control system.

A motor-generator 10 (i.e., the electric rotating machine) is used as a main drive source mounted in the vehicle and connected to driven wheels of the vehicle (not shown). The motor-generator 10 is coupled with a high-voltage battery 12 through an inverter IV and a converter CV. The converter CV is equipped with a smoothing capacitor C, two switching devices Scp and Scn connected in parallel to the smoothing capacitor C, and a reactor L which connects between a joint of the switching devices Scp and Scn and a positive terminal of the high-voltage battery 12. Specifically, the converter CV works to step-up the voltage (e.g., 288V) at the high-voltage battery 12 to a maximum of, for example, 666V in response to on/off operations of the switching devices Scp and Scn.

The inverter IV is equipped with a series-connected assembly of two switching devices Sup and Sun, a series-connected assembly of two switching devices Svp and Svn, and a series-connected assembly of two switching devices Swp and Swn. The series-connected assemblies are, as can be seen in FIG. 1, joined electrically to three respective phase windings (which will also be referred to as a U-phase winding, a V-phase winding, and a W-phase winding below) of the motor-generator 10.

The switching devices Scp, Scn, Scp, Scn, Sup, Sun, Svp, Svn, Swp, and Swn will also be generally referred to below as switching devices S*# (*=c, u, v, or w; #=p or n). The switching devices S*# are of a voltage-controlled type and made of an insulated gate bipolar transistor (IGBT) in this embodiment. The switching devices S*# are all identical in specifications with each other. A free-wheel diode FD*# is connected inversely parallel to each of the switching devices S*#.

Additionally, temperature-sensitive diodes (not shown) are disposed near the switching devices S*# to measure temperatures of the switching devices S*#, respectively. The temperature-sensitive diodes are all identical in specifications with each other and will be described later in detail.

The control system also includes a controller 14 and an interface 18. The controller 14 is supplied with electric power from a low-voltage battery 16 and mainly made of a microcomputer. The controller 14 works to bring an output of the motor-generator 10 into agreement with a torque command value Tr* through the inverter IV and the converter CV. Specifically, the controller 14 executes software tasks to produce and output drive signals to the switching devices S*# through the interface 18. The switching devices S*# are turned on or off in response to the drive signals. More specifically, a set of the higher potential switching devices S*p and a set of the lower potential switching devices S*n are turned on alternately.

The torque command value Tr* is inputted to the controller 14 from an upper controller which controls overall operations of the vehicle. The converter CV, the inverter IV, and the controller 14 constitute a power control unit (PCU).

The interface 18 works as an electrically insulating transmitter to insulate a high-voltage system made up of the high-voltage battery 12, the converter CV, the inverter IV, and the motor-generator 10 from a low-voltage system made up of the low-voltage battery 16 and the controller 14 and also to achieve transmission of signals between the high-voltage system and the low-voltage system without sacrificing the electric insulation. The high-voltage system will also be referred to below as a first system. The low-voltage system will also be referred to below as a second system.

Figure 2:
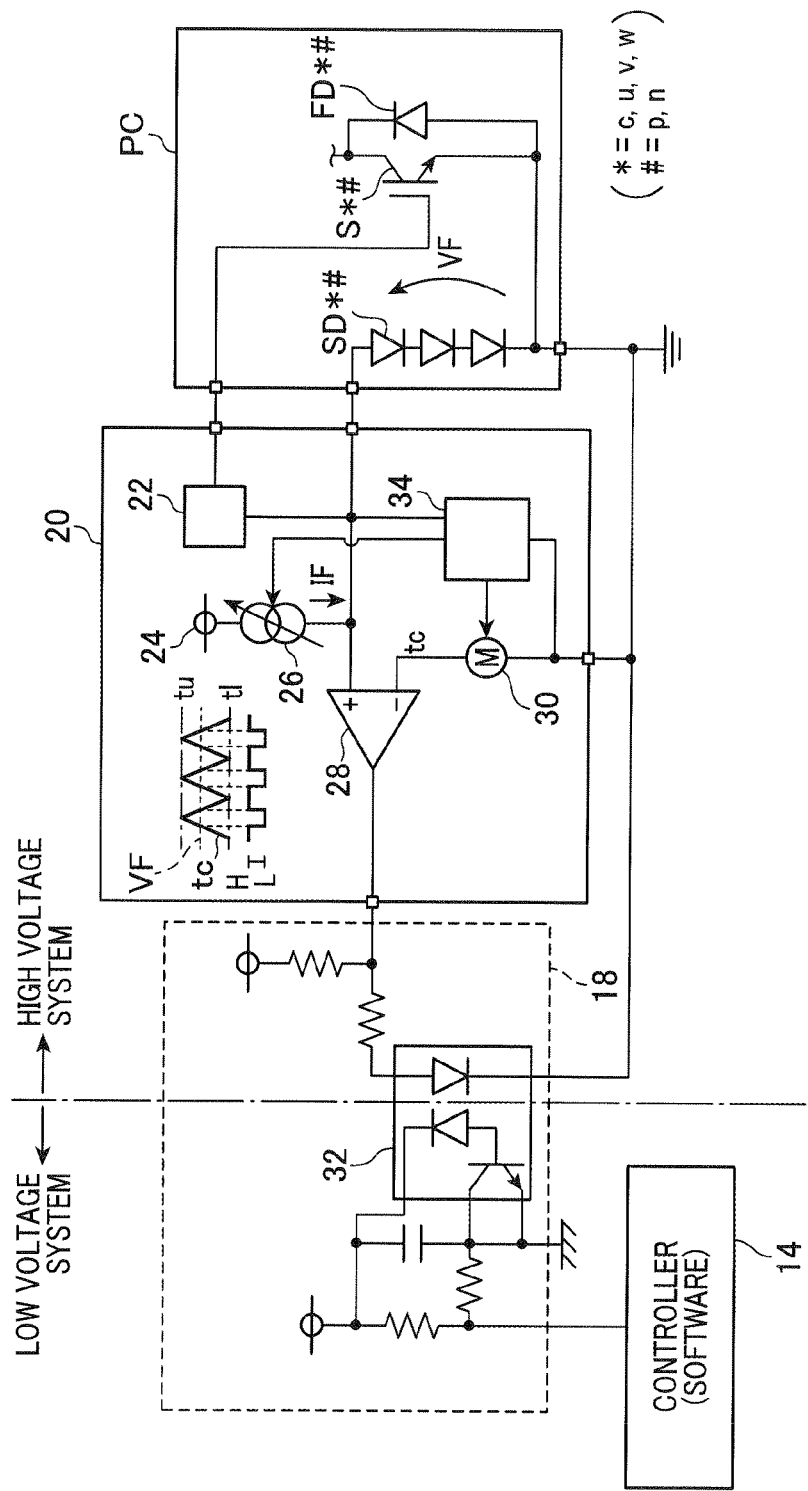
FIG. 2 is a circuit diagram which illustrates a structure of a temperature measuring apparatus according to the first embodiment.

A drive circuit and a temperature measuring circuit for the switching devices S*# will be described below with reference to FIG. 2. FIG. 2 omits a portion of the interface 18 which serves to transmit the drive signals to the switching devices S*#. Such a portion will also be referred to as a drive signal transmitting interface below The switching devices S*# are packed in a power card PC along with free-wheel diodes FD*# and temperature-sensitive diodes SD*#. A given number of the temperature-sensitive diodes SD*# are provided for each of the switching devices S*# as a temperature-sensitive diode assembly (which will also be referred to as a diode arm) to produce a signal VF (i.e., a voltage drop) which is negatively correlated with the temperature of the switching device S*#. The temperature-sensitive diode assembly will also be denoted by SD*# below.

The switching device S*# is connected at an open/close control terminal (i.e., a gate) to an integrated circuit 20. The integrated circuit 20 is a semiconductor device engineered only for driving the switching device S*# and includes a drive controller 22. The drive controller 22 is responsive to the drive signal, as inputted through the drive signal transmitting interface, to turn on or off the switching device S*# and to achieve a local shutdown. The local shutdown is to inhibit the switching device S*# from being driven when the output signal VF of the temperature-sensitive diode assembly SD*# is lower than a specified voltage level (i.e., the temperature of the switching device S*# is greater than a specified temperature level) meaning that the switching device S*# is being overheated. The specified temperature level is set to, for example, a lower limit at which the reliability in operation of the switching device S*# will drop greatly in a small amount of time. The specified voltage level is set to a value of the output voltage VF of the temperature-sensitive diode assembly SD*# when the temperature of the switching device S*# reaches the specified temperature level. The local shutdown brings the switching device S*# into the off-state quickly to avoid a great decrease in reliability of operation of the switching device S*# arising from being overheated.

The integrated circuit 20 also works to convert the output signal VF from the temperature-sensitive diode assembly SD*# into a binary signal. Specifically, the integrated circuit 20 is equipped with a power source 24, a constant-current power source 26 supplied with electric power from the power source 24, and a PWM comparator 28. The constant-current power source 26 of this embodiment is designed to variably produce an output current IF.

The constant-current power source 26 is connected at an output terminal thereof to an anode of the temperature-sensitive diode assembly SD*#. The temperature-sensitive diode assembly SD*# is connected at a cathode thereof to ground.

The anode of the temperature-sensitive diode assembly SD*# is also connected to a non-inverting input terminal of the PWM comparator 28. The PWM comparator 28 is also connected at an inverting input terminal thereof to a carrier generating circuit 30 which generates a triangle wave signal tc. The PWM comparator 28 compares the output signal VF from the temperature-sensitive diode assembly SD*# with the triangle wave signal tc to pulse-width-modulate the output signal VF. The output signal of the PWM comparator 28, thus, changes in a duty cycle thereof as a function of the level of the output signal VF from the temperature-sensitive diode assembly SD*#. The duty cycle of the output signal of the PWM comparator 28 is the ratio of a high-level time for which the output signal is at a logic high (H) level to a periodic cycle in which the output signal changes from a logic low (L) level to the logic high level and to the logic low level. The PWM comparator 28 and the carrier generating circuit 30 function as a modulator.

The output signal VF of the temperature-sensitive diode assembly SD*# shows a negative correlation with an actual temperature of the switching device S*#. This causes the duty cycle of the output signal of the PWM comparator 28 to increase with an increase in level of the output signal VF. In other words, a rise in temperature of the switching device S*# results in a decrease in duty cycle of the output signal of the PWM comparator 28.

The output terminal of the PWM comparator 28 is connected electrically to a primary side (i.e., a photo-diode) of a photo-coupler 32 which constitutes the interface 18.

To a secondary side of the photo-coupler 32, the controller 14 is connected electrically. The controller 14 executes a logic conversion operation (i.e., a software program) to translate the analog signal outputted from the PWM comparator 28 into a digital form and also executes a logic temperature determining operation to determine the temperature of the switching device S*# as a function of such a digital signal. Specifically, the controller 14 calculates the temperature Td of the switching device S*# as increasing with a decrease in duty cycle of the pulse signal outputted from the PWM comparator 28. More specifically, the controller 14 looks up a temperature map, as described later in detail, which lists a relation between the duty cycle of the output signal of the PWM comparator 28 and the temperature Td of the switching device S*# and reads a value from the temperature map which corresponds to the value of the duty cycle of the output from the PWM comparator 28. The temperature map is made under the condition where the number of the temperature-sensitive diodes SD*# provided for each of the switching devices S*# is set to a given value, as will be described later in detail.

When determining the calculated temperature Td as having exceeded a threshold value which is set lower than the above described specified temperature level, the controller 14 initiates a power saving mode to limit the torque command value Tr*. This controls or reduces the collector current of the switching device S*# to protect it from overheating.

In order to reduce the number of parts, the interface 18 which connects with the PWM comparator 28 and the carrier generating circuit 30 is actually provided only for a preselected one of the eight switching devices S*# of the inverter IV and the converter CV except the drive signal transmitting interface. Specifically, the interface 18 is provided for one of the switching devices S*# which is expected to be most increased in temperature thereof. In this embodiment, one of the switching devices S*# which is connected to the integrated circuit 20 equipped with the PWM comparator 28, etc. will be referred to below as a switching device Sa. One of the temperature-sensitive diode assemblies SD*# which is provided for the switching device Sa will be denoted by SDa below.

A determination operation and a correcting operation will be described below.

The determination operation is made by a determination circuit 34 of the integrated circuit 20 associated with the switching device Sa. The determination operation is to determine the number of the temperature-sensitive diodes SD*# which are now connected together as the temperature-sensitive diode assembly SDa. The correcting operation is also made by the determination circuit 34 to correct the amplitude of the triangle wave signal outputted from the carrier generating circuit 30 so that the duty cycle of the pulse signal outputted from the PWM comparator 28 matches the temperature map used in the above described temperature determining operation. The need for the determination operation and the correcting operation will be described below with reference to FIGS. 3(A), 3(B), and 3(C).

FIG. 3(A) represents a relation between an actual temperature Tj of the switching device Sa and the output signal VF of the temperature-sensitive diode assembly SDa. FIG. 3(B) represents a relation between the output signal VF and the duty cycle of the output signal from the PWM comparator 28. FIG. 3(C) illustrates the temperature map for use in the temperature determining operation. The number N of the temperature-sensitive diodes SD*# which may constitute the temperature-sensitive diode assembly SDa is set in this embodiment to either of two or three. The temperature map for use in the temperature determining operation in this embodiment is made for the case where the number N of the temperature-sensitive diodes SD*# is set to a specified value of three.

An increase in number N of the temperature-sensitive diodes SD*# connected together, as can be seen in FIG. 3(A), results in an increase in the output signal VF of the temperature-sensitive diode assembly SDa in response to the temperature Tj of the switching device Sa. Therefore, an available range RngVF2 of the output signal VF of the temperature-sensitive diode assembly SDa within a temperature measurable range of a lower temperature limit Tmin to an upper temperature limit Tmax for the switching device Sa in the case where the number N of the temperature-sensitive diodes SD*# connected together to form the temperature-sensitive diode assembly SDa is two is smaller than that (i.e., an available range RngVF3) in the case where the number N of the temperature-sensitive diodes SD*# is three.

When the available ranges RngVF2 and RngVF3 of the output signal VF of the temperature-sensitive diode assembly SDa are different from each other, it will, as illustrated in FIG. 3(B), result in a difference between an available range RngDy2 of the duty cycle of the output signal from the PWM comparator 28 in the case where the number N of the temperature-sensitive diodes SD*# is two and an available range RngDy3 of the duty cycle of the output signal from the PWM comparator 28 in the case where the number N of the temperature-sensitive diodes SD*# is three. This will, thus, result in, as illustrated in FIG. 3(C), a difference between an available range RngTd2 of the temperature Td, as derived using the temperature map, in the case where the number N of the temperature-sensitive diodes SD*# is two and an available range RngTd3 of the temperature Td, as derived using the temperature map, in the case where the number N of the temperature-sensitive diodes SD*# is three. Therefore, when the number of the temperature-sensitive diodes SD*# which are actually connected together to form the temperature-sensitive diode assembly SDa is different from the number N of the temperature-sensitive diodes SD*# which is selected to make the temperature map, it will result in a drop in accuracy of calculating the temperature of the switching device Sa in the temperature determining operation, which may lead to a failure in protecting the switching devices S*# from overheating in the power saving mode. In order to alleviate such a problem, the above described determination operation and the correcting operation are made.

FIG. 4 is a flowchart of a sequence of logical steps to perform the determination and correcting operations. The determination circuit 34 is hardware and thus performs the program of FIG. 4 through a logic circuit.

After entering the program, the routine proceeds to step S10 wherein it is determined whether the switching device Sa is not yet activated or not, in other words, the inverter IV and the converter CV are required to be started or not. This determination is made to determine whether a condition to execute the determination and correcting operations has been met or not.

If a YES answer is obtained in step S10 meaning that the condition for execution of the determination and correcting operations has been satisfied, then the routine proceeds to steps S12 and S14 to execute the determination operation which analyzes a change in the output signal VF from the temperature-sensitive diode assembly SDa, as derived by shifting the output current IF of the constant-current power source 26 from a first constant current I1 to a second constant current I2, to calculate the number N of the temperature-sensitive diodes SD*# connected together to form the temperature-sensitive diode assembly SDa. Such a change will also be referred to below as a judging potential difference ΔVjde. How to determine the number N of the temperature-sensitive diodes SD*# will be discussed below with reference to FIGS. 5 and 6.

Figure 5:
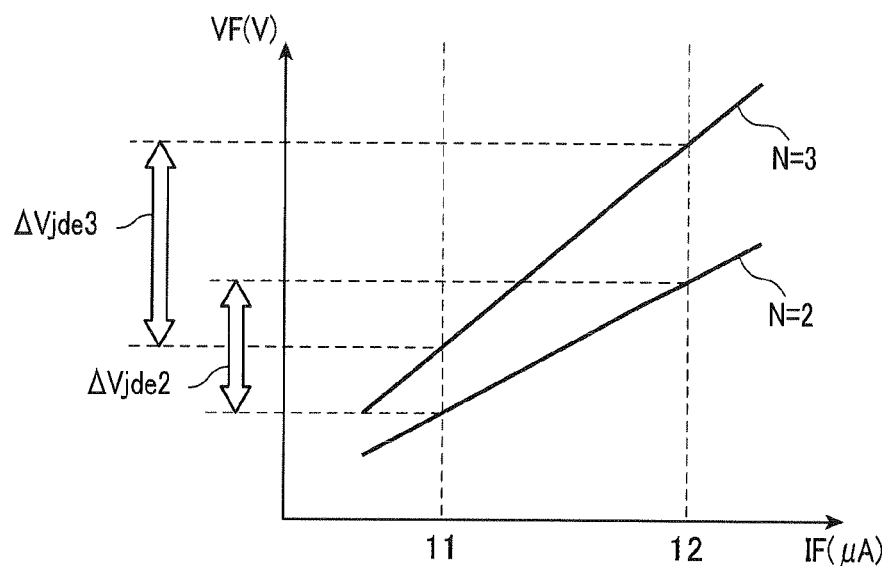
FIG. 5 is a view which illustrates a relation between an output current from a constant-current power source and an output signal from a temperature-sensitive diode assembly.

FIG. 5 illustrates a relation between the output current IF of the constant-current power source 26 and the output signal VF of the temperature-sensitive diode assembly SDa.

Figure 6:
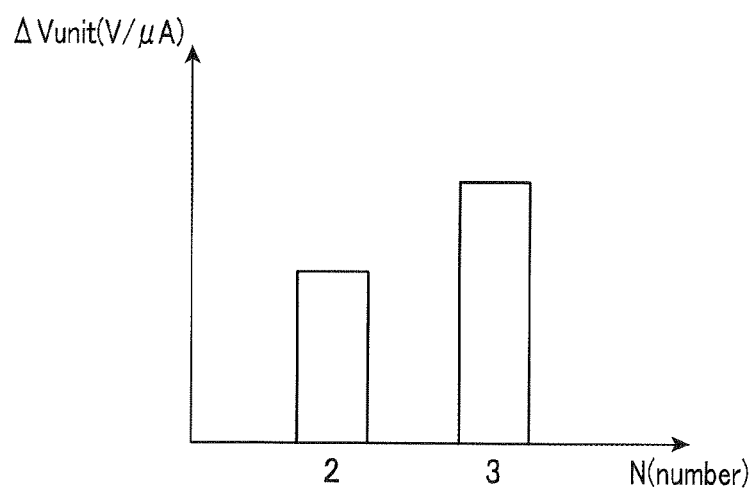
FIG. 6 is a view which represents a relation between the number of temperature-sensitive diodes and a voltage drop outputted from a temperature-sensitive diode assembly of the temperature-sensitive diodes.

A judging potential difference ΔVjde3 that is a change in the output signal VF, as derived by shifting the output current IF of the constant-current power source 26 from the first constant current I1 to the second constant current I2 in the case where the number N of the temperature-sensitive diodes SD*# of the temperature-sensitive diode assembly SDa is three, is found, as shown in FIG. 5, to be greater than a judging potential difference ΔVjde2 in the case where the number N of the temperature-sensitive diodes SD*# of the temperature-sensitive diode assembly SDa is two. This is, as described already, because an increase in number N of the temperature-sensitive diodes SD*#, as can be seen in FIG. 6, results in an increase in voltage drop ΔVunit per unit current flowing through the temperature-sensitive diode assembly SDa. The judging potential difference ΔVjde may, therefore, be used to determine the number N of the temperature-sensitive diodes SD*#.

Referring back to step S12 of FIG. 4, the judging potential difference ΔVjde is calculated in the above manner. The routine then proceeds to step S14 wherein the number N of the temperature-sensitive diodes SD*# is determined using the judging potential difference ΔVjde. Specifically, such a determination is made by look-up using a map listing a relational combinations of values of the judging potential difference ΔVjde and values of the number N of the temperature-sensitive diodes SD*# based on the judging potential difference ΔVjde, as derived in step S12.

The routine proceeds to step S16 wherein the correcting operation is made to correct the amplitude of the triangle wave signal tc outputted from the carrier generating circuit 30 so as to bring the value of the duty cycle of the pulse signal outputted from the PWM comparator 28 into agreement with that when the number N of the temperature-sensitive diodes SD*# is set to the above described specified value (i.e., 3 in this embodiment). In other words, the output signal from the PWM comparator 28 which has information used in the temperature determining operation executed by the controller 14 is so corrected as to match the number N of the temperature-sensitive diodes SD*#, as determined in step S14. Specifically, such correction may be made by altering at least one of a maximum value to and a minimum value tl of the triangle wave signal tc while keeping the frequency of the triangle wave signal tc fixed (see FIG. 2).

Alternatively, if a NO answer is obtained in step S10 or after step S16, the routine terminates.

The integrated circuit 20 is preferably designed to correct the output signal VF of the temperature-sensitive diode assembly SDa which is used to perform the local shutdown based on the number N of the temperature-sensitive diodes SD*#, as determined in step S14.

The beneficial effects offered by the determination and correcting operations will be described with reference to FIGS. 7(A) to 7(C) which correspond to FIGS. 3(A) to 3(C), respectively.

Figure 7:
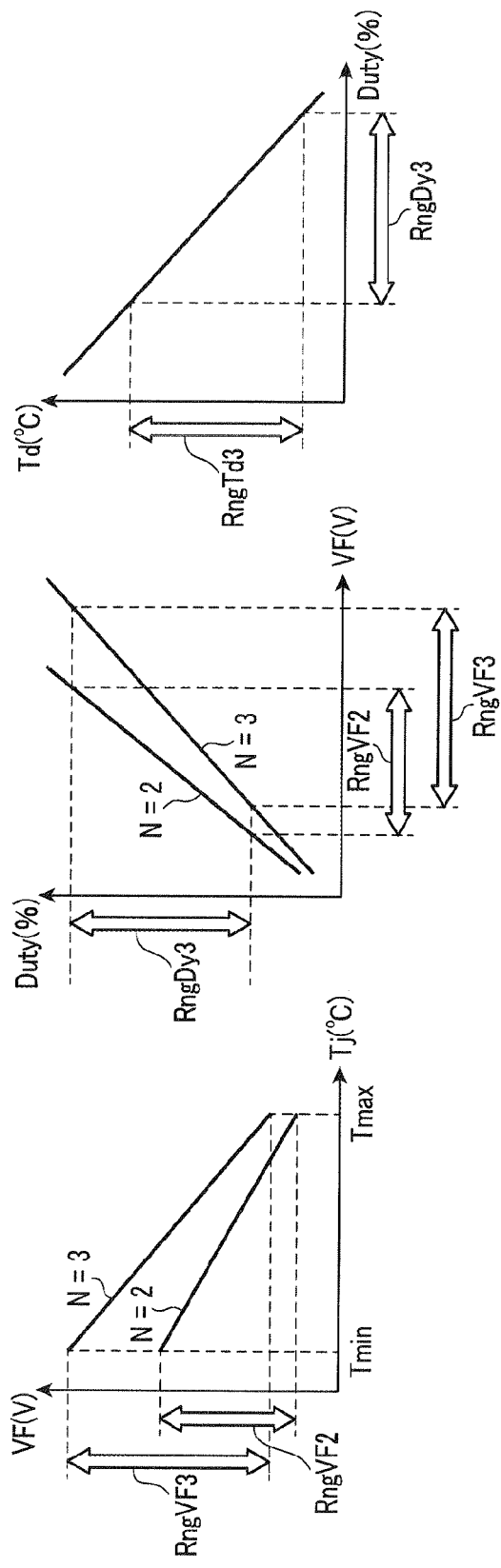
FIG. 7A is a view which represents a relation between an actual temperature of a switching device and an output signal from a temperature-sensitive diode assembly.
FIG. 7B is a view which represents a relation between an output signal from a temperature-sensitive diode assembly and a duty cycle of an output signal from a PWM comparator after corrected.
FIG. 7C is a view which illustrates a temperature map for use in a temperature determining operation.

A change in number N of the temperature-sensitive diodes SD*# connected together, as can be seen in FIG. 7(B), results in a difference between the available range RngVF2 of the output signal VF of the temperature-sensitive diode assembly SDa in the case where the number N of the temperature-sensitive diodes SD*# is two and the available range RngVF3 in the case where the number N of the temperature-sensitive diodes SD*# is three. The correcting operation, as illustrated in FIG. 7(B), works to bring an available range of the duty cycle of the output signal of the PWM comparator 28 into agreement with the range RngDy3 which matches the temperature map for use in the temperature determining operation. This, as demonstrated in FIG. 7(C), avoids a drop in accuracy of calculating the temperature of the switching device Sa.

The temperature measuring apparatus of the first embodiment offers beneficial advantages, as discussed below.

The determination operation is made to determine the number N of the temperature-sensitive diodes SD*# connected together as a function of the judging potential difference ΔVjde. The judging potential difference ΔVjde depends directly on the number N of the temperature-sensitive diodes SD*# regardless of the temperature of the switching device Sa, thus ensuring the accuracy in calculating the number N of the temperature-sensitive diodes SD*# connected together for the switching device Sa.

The use of the judging potential difference ΔVjde as a parameter for determining the number N of the temperature-sensitive diodes SD*# eliminates the need for an additional circuit which transmits the signal, as used in the determination operation, from the low-voltage system to the high-voltage system, thus resulting in a simplified structure of the control system.

The correcting operation is made to correct the amplitude of the triangle wave signal tc outputted from the carrier generating circuit 30 so as to bring the duty cycle of the output signal from the PWM comparator 28 into agreement with that when the number N of the temperature-sensitive diodes SD*# is set to the above described specified value (i.e., 3 in this embodiment), thus enabling temperature information about the switching device Sa independent of the number N of the temperature-sensitive diodes SD*# to the controller 14.

The determination operation and the correcting operation are made before the switching device Sa starts to be activated, thus enabling the triangle wave signal tc to be corrected automatically as a function of the number N of the temperature-sensitive diodes SD*# at the time of start-up of the inverter IV, etc. even when the number N of the temperature-sensitive diodes SD*# has been changed depending upon specifications of the control system.

The second embodiment will be described below which is different from the first embodiment in the determination operation. The second embodiment employs the constant-current power source 26 designed to produce the output current IF which is fixed in level.

Figure 8:
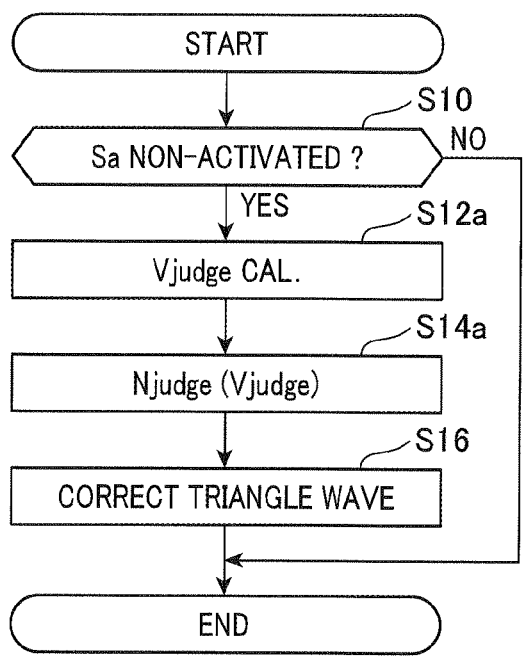
FIG. 8 is a flowchart of a sequence of logical steps to perform determination and correcting operations in the temperature measuring apparatus of the second embodiment.

FIG. 8 is a flowchart of a sequence of logical steps to perform the determination and correcting operations to be executed in the determination circuit 34 of the second embodiment.

The determination circuit 34 is hardware and thus performs the program of FIG. 8 through a logic circuit. The same step numbers as employed in FIG. 4 will refer to the same operations.

If a YES answer is obtained in step S10 meaning that the condition for executing the determination and correcting operations has been satisfied, then the routine proceeds to step S12a wherein a judging voltage Vjudge that is the output signal VF of the temperature-sensitive diode assembly SDa, as derived by supplying a constant current to the temperature-sensitive diode assembly SDa through the constant-current power source 26, is measured.

The routine then proceeds to step S14a wherein the number N of the temperature-sensitive diodes SD*# connected together to constitute the temperature-sensitive diode assembly SDa is determined using the judging voltage Vjudge. Specifically, such a determination is made by look-up using a map listing a relational combinations of values of the judging voltage Vjudge and values of the number N of the temperature-sensitive diodes SD*# based on the judging voltage Vjudge, as derived in step S12a. The reason why the judging voltage Vjudge is used as a parameter to calculate the number N of the temperature-sensitive diodes SD*# connected together is because an increase in number N of the temperature-sensitive diodes SD*# connected together will result in a rise in level of the judging voltage Vjudge.

It is advisable that the determination operation be made in the condition where the temperature of the switching device Sa is at a given level or lies in a given range in order to minimize a risk of an error in determining the number N of the temperature-sensitive diodes SD*# connected together to constitute the temperature-sensitive diode assembly SDa. Specifically, when an actual temperature of the switching device Sa at the time of the determination operation is greatly different from the above given level, it may cause a relation between the judging voltage Vjudge and the number N of the temperature-sensitive diodes SD*# to fall out of the relational combinations listed in the map, which leads to a failure in calculating the number N of the temperature-sensitive diodes SD*# accurately. The determination of whether the temperature of the switching device Sa is at the given level or lies in the given range or not may be achieved using an output of a temperature sensor engineered to measure the temperature of the integrated circuit 20 which correlates with the temperature of the switching device Sa.

After step S14a, the routine proceeds to step S16.

Alternatively, if a NO answer is obtained in step S10 or after step S16, the routine terminates.

The third embodiment will be described below which is different in the determination operation from the first embodiment.

Figure 9:
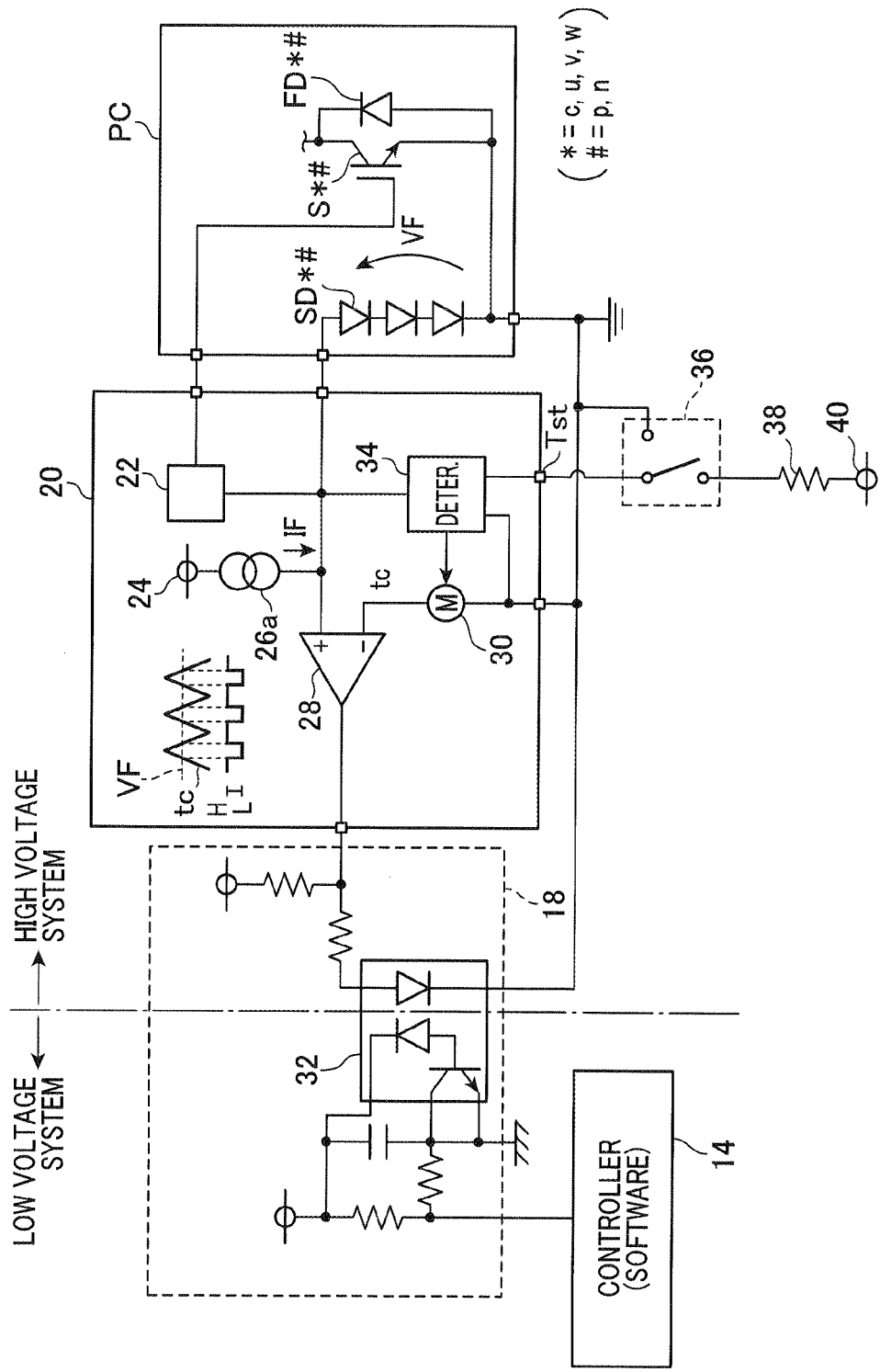
FIG. 9 is a circuit diagram which illustrates a structure of a temperature measuring apparatus according to the third embodiment.

FIG. 9 illustrates a structure of the temperature measuring circuit for the switching device S*#. The same reference numbers as employed in FIG. 2 will refer to the same parts.

The determination circuit 34 connects with a terminal (i.e., a switching terminal Tst) of the integrated circuit 20 and also with an electric power source 40 through a switch 36 and a resistor 38. The switch 36, the resistor 38, and the power source 40 are coupled externally to the integrated circuit 20. The switch 36 works to selectively establish an electric connection between the determination circuit 34 and one of ends of the resistor 38 which is opposite the power source 40 or between the determination circuit 34 and ground (or a portion of the high voltage system connected to ground).

The constant-current power source 26a is, as described above, designed to produce the output current IF which is fixed in level.

Other arrangements are identical with those in FIG. 2, and explanation thereof in detail will be omitted here.

The determination operation to be executed by the determination circuit 34 will be described below. The determination circuit 34 analyzes a logic value of an external signal Sig, as inputted thereto through the switching terminal Tst, to calculate the number N of the temperature-sensitive diodes SD*# connected together to constitute the temperature-sensitive diode assembly SDa.

Figure 10:
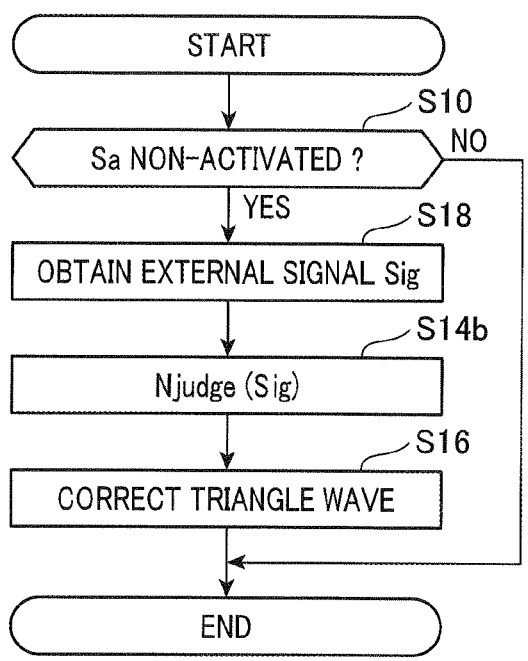
FIG. 10 is a flowchart of a sequence of logical steps to perform determination and correcting operations in the temperature measuring apparatus of FIG. 9.

FIG. 10 is a flowchart of a sequence of logical steps to perform the determination and correcting operations to be executed in the determination circuit 34 of the third embodiment.

The determination circuit 34 is hardware and thus performs the program of FIG. 10 through a logic circuit. The same step numbers as employed in FIG. 4 will refer to the same operations.

If a YES answer is obtained in step S10 meaning that the condition for executing the determination and correcting operations has been satisfied, then the routine proceeds to step S18 wherein the external signal Sig is acquired and analyzed to determine the number N of the temperature-sensitive diodes SD*#. Specifically, the external signal Sig is either at a logic high (H) level or at a logic low (L) level. The logic high level represents that the number N is two, while the logic low level represents that the number N is three. In a production process of the control system (i.e., the temperature measuring apparatus of this embodiment), the switch 36 has already been operated to connect between the determination circuit 34 and the resistor 38 in the case where the number N of the temperature-sensitive diodes SD*# connected together to form the temperature-sensitive diode assembly SDa is two or between the determination circuit 34 and ground in the case where the number N is three. The switch 36 is not so designed that it may be operated after the control system is manufactured. After step S14b, the routine proceeds to step S16.

Alternatively, if a NO answer is obtained in step S10 or after step S16, the routine terminates.

The fourth embodiment will be described below which is different in the determination operation from the first embodiment.

Figure 11:
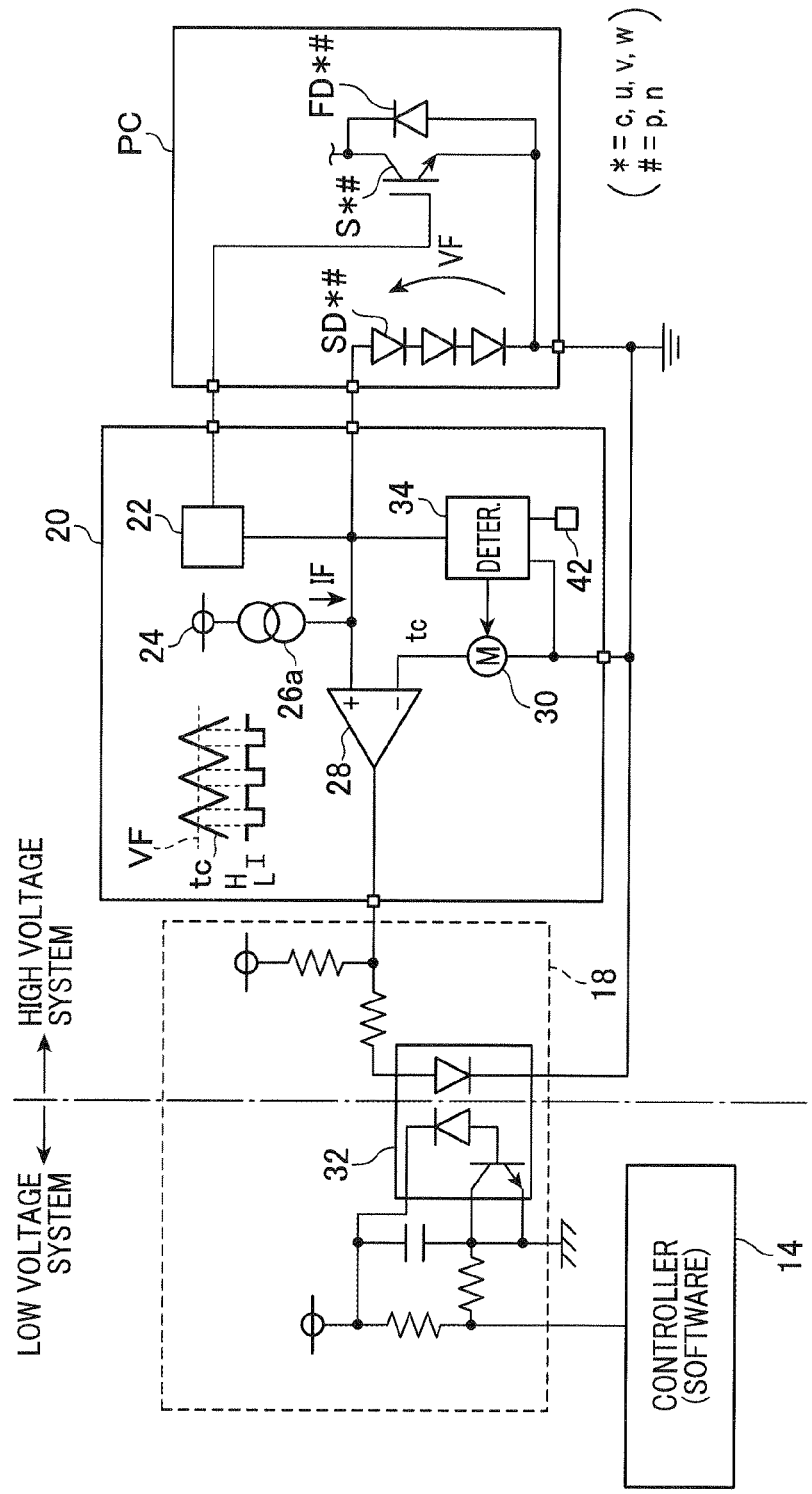
FIG. 11 is a circuit diagram which illustrates a structure of a temperature measuring apparatus according to the fourth embodiment.

FIG. 11 illustrates a structure of the temperature measuring circuit for the switching device S*#. The same reference numbers as employed in FIG. 9 will refer to the same parts.

The integrated circuit 20 is equipped with a temperature sensor 42 which measures the temperature of the integrated circuit 20. The temperature of the integrated circuit 20 is positively correlated with that of the switching device Sa. The temperature sensor 42 produces and outputs a detection value Te representing the temperature of the integrated circuit 20 to the determination circuit 34.

Other arrangements are identical with those in FIG. 2, and explanation thereof in detail will be omitted here.

The determination operation to be executed by the determination circuit 34 will be described below. The determination circuit 34 analyzes the output signal VF of the temperature-sensitive diode assembly SDa and the detection value Te, as outputted by the temperature sensor 42, to determine the number N of the temperature-sensitive diodes SD*#.

Figure 12:
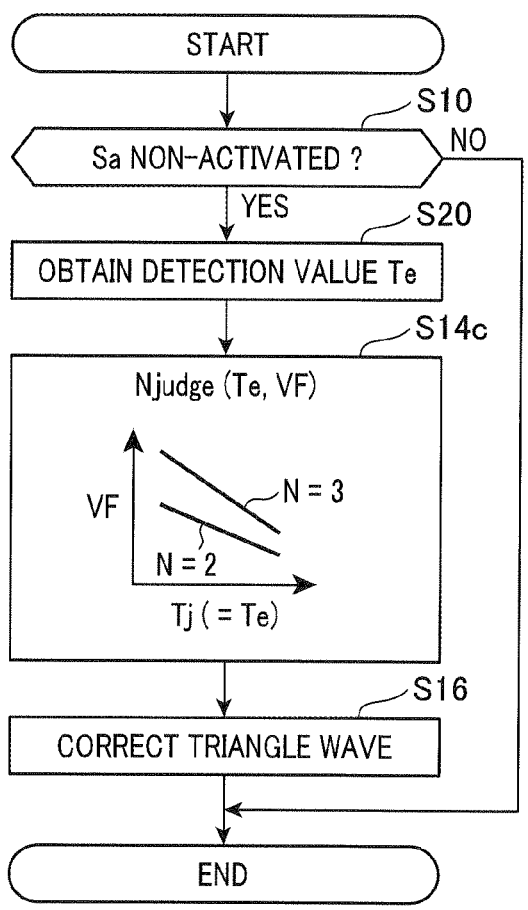
FIG. 12 is a flowchart of a sequence of logical steps to perform determination and correcting operations in the temperature measuring apparatus of FIG. 11.

FIG. 12 is a flowchart of a sequence of logical steps to perform the determination and correcting operations to be executed in the determination circuit 34 of the fourth embodiment.

The determination circuit 34 is hardware and thus performs the program of FIG. 12 through a logic circuit. The same step numbers as employed in FIG. 10 will refer to the same operations.

If a YES answer is obtained in step S10 meaning that the condition for executing the determination and correcting operations has been satisfied, then the routine proceeds to step S20 wherein the detection value Te, as outputted from the temperature sensor 42, is acquired and analyzed. The condition, as determined in step S10 to have been met, is a condition where the switching device Sa is in thermal equilibrium, meaning that the detection value Te, as inputted from the temperature sensor 42 to the determination circuit 34 in step S20, is substantially identical with an actual temperature Tj of the switching device Sa.

The routine proceeds to step S14c wherein the number N of the temperature-sensitive diodes SD*# connected together to form the temperature-sensitive diode assembly SDa is determined based on the detection value Te, as outputted from the temperature sensor 42, and the output signal VF of the temperature-sensitive diode assembly SDa. This determination is made based on the facts that the detection value Te, as outputted by the temperature sensor 42, is substantially identical with the actual temperature Tj of the switching device Sa, and the actual temperature Tj of the switching device Sa, the output signal VF of the temperature-sensitive diode assembly SDa, and the number N of the temperature-sensitive diodes SD*# show a given relation to each other. For example, the determination circuit 34 determines the number N of the temperature-sensitive diodes SD*# by look-up using a map, as illustrated in FIG. 12, listing the relation of the number N of the temperature-sensitive diodes SD*# to the temperature Tj of the switching device Sa and the output signal VF of the temperature-sensitive diode assembly SDa. After step S14c, the routine proceeds to step S16.

Alternatively, if a NO answer is obtained in step S10 or after step S16, the routine terminates.

The fifth embodiment will be described below which is a modification of the third embodiment and different therefrom in the determination operation.

Figure 13:
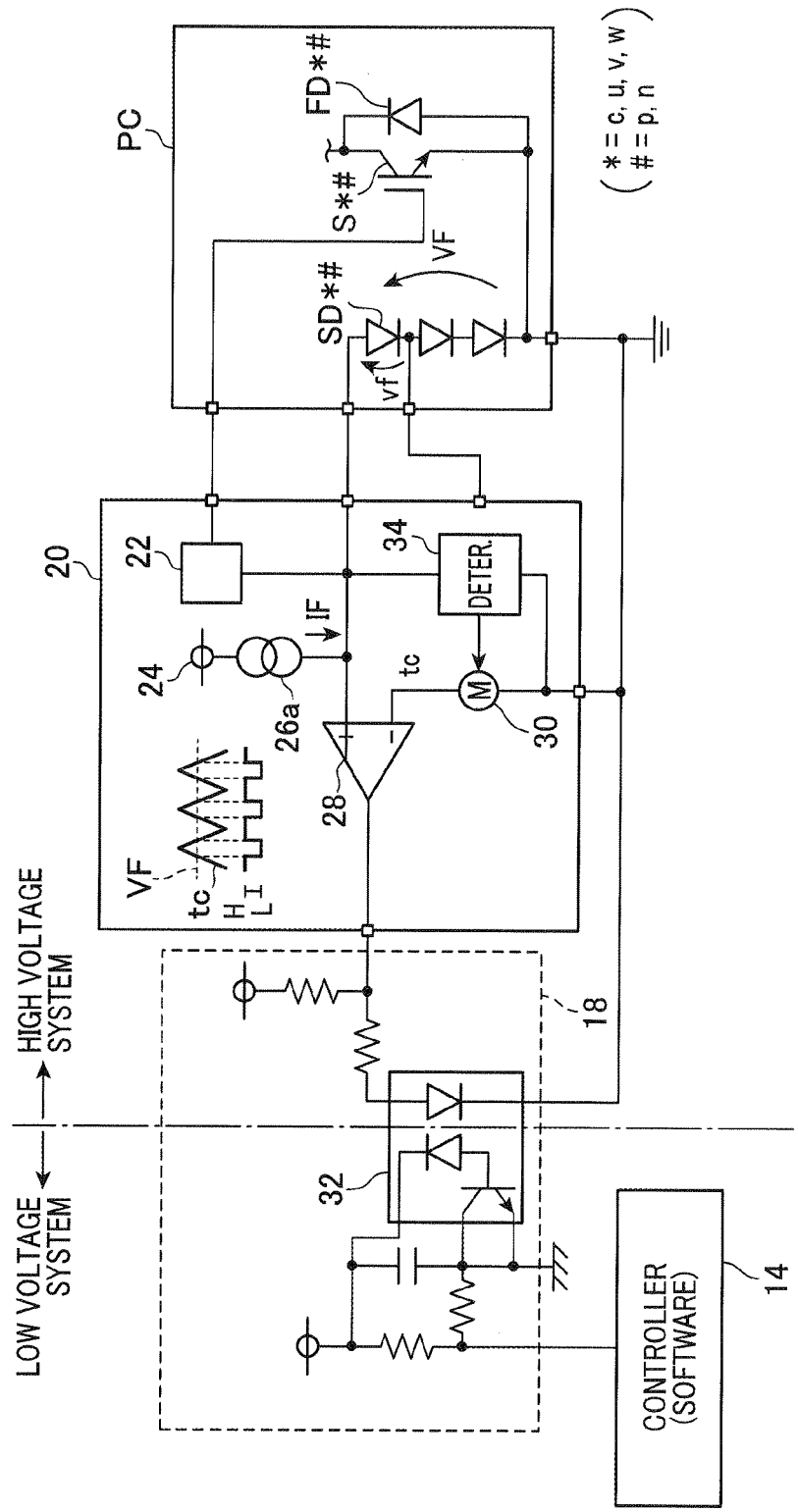
FIG. 13 is a circuit diagram which illustrates a structure of a temperature measuring apparatus according to the fifth embodiment.

FIG. 13 illustrates a structure of the temperature measuring circuit for the switching device S*#. The same reference numbers as employed in FIG. 9 will refer to the same parts.

The determination circuit 34 connects with one of the temperature-sensitive diodes SD*# which are connected together to form the temperature-sensitive diode assembly SDa through an electric path and works to detect an output vf from the one of the temperature-sensitive diodes SD*#.

The determination operation to be executed by the determination circuit 34 will be described below. The determination circuit 34 analyzes the output signal VF of the temperature-sensitive diode assembly SDa and the output vf from the one of the temperature-sensitive diodes SD*# to determine the number N of the temperature-sensitive diodes SD*#.

Figure 14:
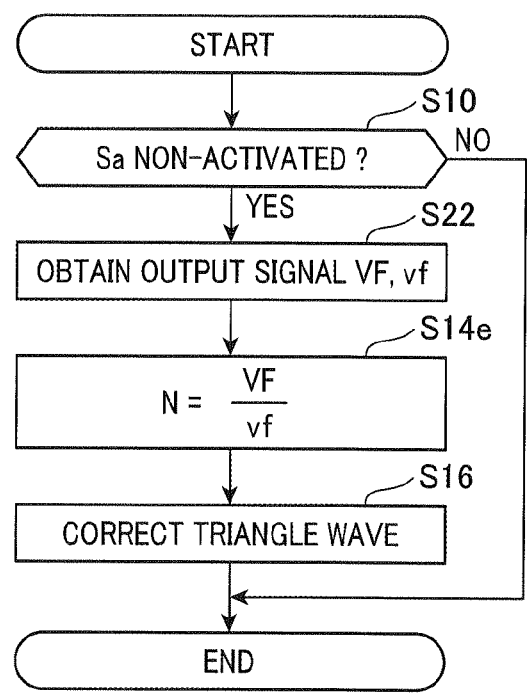
FIG. 14 is a flowchart of a sequence of logical steps to perform determination and correcting operations in the temperature measuring apparatus of FIG. 13.

FIG. 14 is a flowchart of a sequence of logical steps to perform the determination and correcting operations to be executed in the determination circuit 34 of the fifth embodiment. The determination circuit 34 is hardware and thus performs the program of FIG. 14 through a logic circuit. The same step numbers as employed in FIG. 10 will refer to the same operations.

If a YES answer is obtained in step S10 meaning that the condition for executing the determination and correcting operations has been satisfied, then the routine proceeds to step S22 wherein the output signal VF of the temperature-sensitive diode assembly SDa and the output signal vf from the one of the temperature-sensitive diodes SD*# are acquired.

The routine proceeds to step S14e wherein the output signal VF of the temperature-sensitive diode assembly SDa and the output vf from the one of the temperature-sensitive diodes SD*# are analyzed to determine the number N of the temperature-sensitive diodes SD*#. Specifically, the value of the output VF is divided by the value of the output vf to derive the number N. More specifically, a quotient of the values of the output VF and the output vf is rounded to an integer (e.g., the nearest integer) as representing the number N of the temperature-sensitive diodes SD*#. After step S14e, the routine proceeds to step S16.

Alternatively, if a NO answer is obtained in step S10 or after step S16, the routine terminates.

The sixth embodiment will be described below which is a modification of the third embodiment of FIG. 9 and different therefrom in the determination operation.

Figure 15:
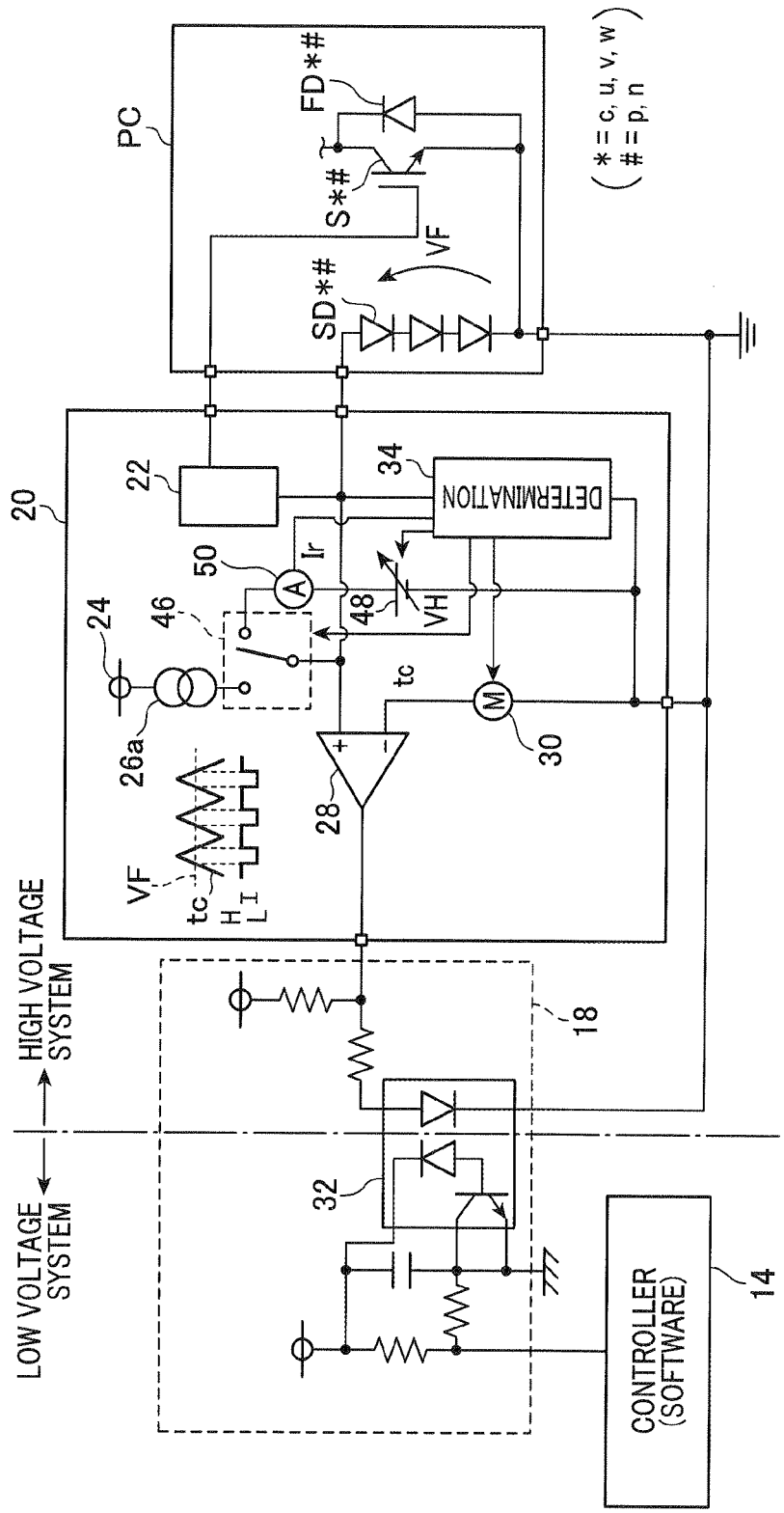
FIG. 15 is a circuit diagram which illustrates a structure of a temperature measuring apparatus according to the sixth embodiment.

FIG. 15 illustrates a structure of the temperature measuring circuit for the switching device S*#. The same reference numbers as employed in FIG. 9 will refer to the same parts.

The integrated circuit 20 includes a switch 46 which is operated by the determination circuit 34, a variable voltage source 48 which variably produces a terminal voltage VH, and a current sensor 50. The switch 46 works to selectively establish an electric connection between the output terminal of the constant-current power source 26a and an anode of the temperature-sensitive diode assembly SDa or between a positive terminal of the variable voltage source 48 and the anode of the temperature-sensitive diode assembly SDa. The variable voltage source 48 is also connected at a negative terminal thereof to a cathode of the temperature-sensitive diode assembly SDa. The current sensor 50 measures an output current from the variable voltage source 48 and outputs a detection value Ir indicative thereof to the determination circuit 34.

The determination operation to be executed by the determination circuit 34 will be described below. The determination circuit 34 analyzes a level of voltage (i.e., a turn-on voltage) which is variably applied by the variable voltage source 48 to the temperature-sensitive diode assembly SDa and at which the temperature-sensitive diode assembly SDa is turned on to determine the number N of the temperature-sensitive diodes SD*# connected together to form the temperature-sensitive diode assembly SDa.

Figure 16:
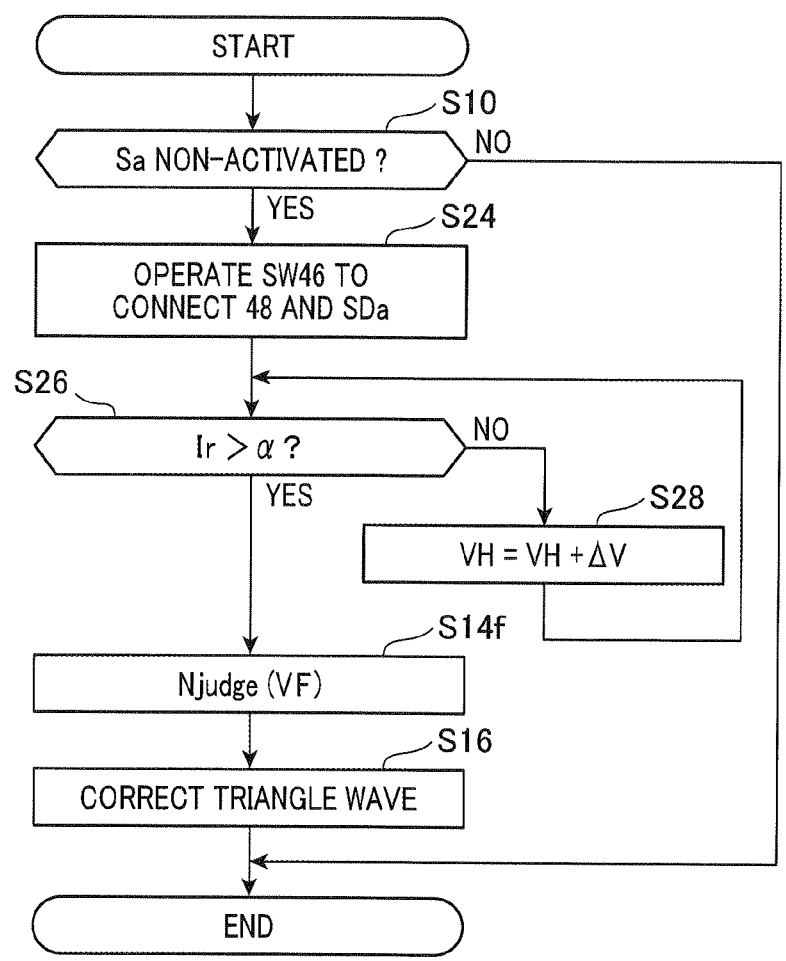
FIG. 16 is a flowchart of a sequence of logical steps to perform determination and correcting operations in the temperature measuring apparatus of FIG. 15.

FIG. 16 is a flowchart of a sequence of logical steps to perform the determination and correcting operations to be executed in the determination circuit 34 of the sixth embodiment. The determination circuit 34 is hardware and thus performs the program of FIG. 16 through a logic circuit. The same step numbers as employed in FIG. 10 will refer to the same operations.

If a YES answer is obtained in step S10 meaning that the condition for executing the determination and correcting operations has been satisfied, then the routine proceeds to step S24 wherein the switch 46 is operated to connect between the anode of the temperature-sensitive diode assembly SDa and the positive terminal of the variable voltage source 48, thereby creating a closed loop extending through the variable voltage source 48 and the temperature-sensitive diode assembly SDa.

The routine proceeds to step S26 wherein it is determined whether the detection value Ir indicative of the output current from the variable voltage source 48, as measured by the current sensor 50, is greater than a given value a or not. If a NO answer is obtained, then the routine proceeds to step S28 wherein the terminal voltage VH at the variable voltage source 48 is incremented by a level ΔV. The routine then returns back to step S26. The given value a is a current value which will be sensed by the current sensor 50 at the time when the temperature-sensitive diode assembly SDa is turned on. Alternatively, if a YES answer is obtained in step S26 meaning that the temperature-sensitive diode assembly SDa has been turned on, then the routine proceeds to step S14f wherein the output signal VF produced by the temperature-sensitive diode assembly SDa when turned on is analyzed to determine the number N of the temperature-sensitive diodes SD*#. How to determine the number N is based on the fact that the greater the number N of the temperature-sensitive diodes SD*#, the greater the level of the output signal VF produced by the temperature-sensitive diode assembly SDa when turned on. After step S14f, the routine proceeds to step S16.

Alternatively, if a NO answer is obtained in step S10 or after step S16, the routine terminates.

After completion of the determination and correcting operations, the determination circuit 34 operates the switch 26 to connect between the output terminal of the constant-current power source 26a and the anode of the temperature-sensitive diode assembly SDa.

The seventh embodiment will be described below which is different in determination and correcting operations from the first embodiment.

Figure 17:
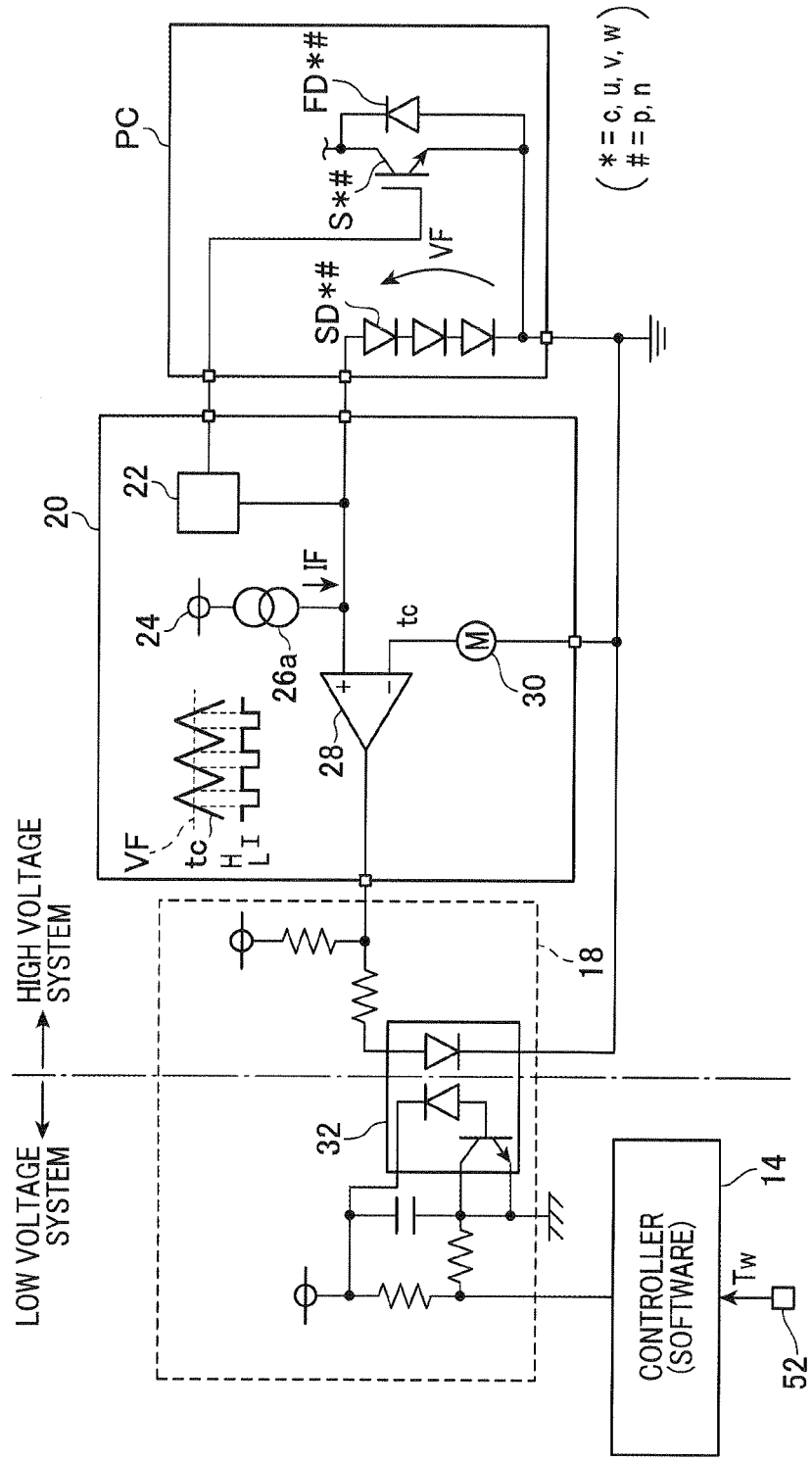
FIG. 17 is a circuit diagram which illustrates a structure of a temperature measuring apparatus according to the seventh embodiment.

FIG. 17 illustrates a structure of the temperature measuring circuit for the switching device S*#. The same reference numbers as employed in FIG. 2 will refer to the same parts.

The control system includes a low voltage side temperature sensor 52 which works to measure the temperature of coolant flowing through a cooler to cool the inverter IV and the converter CV. The temperature sensor 52 outputs a detection value Tw indicative of the temperature of the coolant to the controller 14. The temperature of the coolant is positively correlated with the temperature of the switching device Sa.

The integrated circuit 20 does not have the determination circuit 34. The constant-current power source 26a is designed to produce the output current IF which is fixed in level.

Other arrangements are identical with those in FIG. 2, and explanation thereof in detail will be omitted here.

Figure 18:
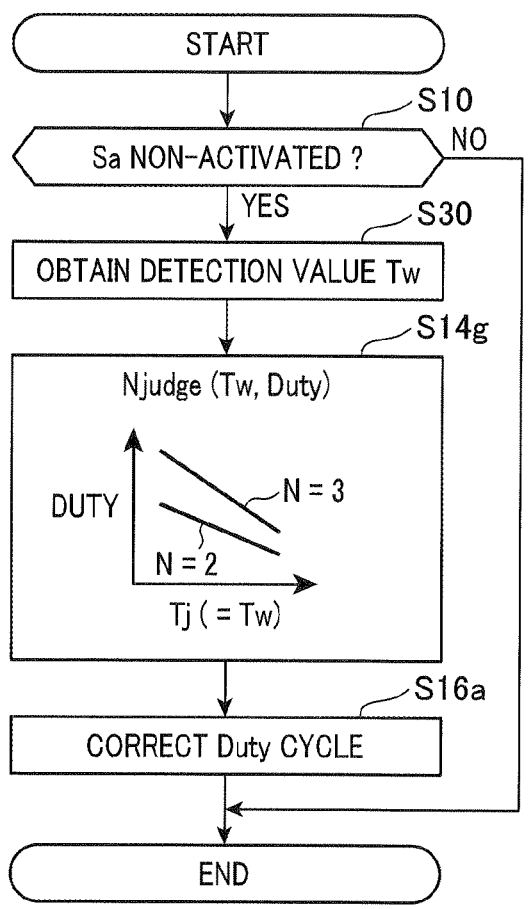
FIG. 18 is a flowchart of a sequence of logical steps to perform determination and correcting operations in the temperature measuring apparatus of FIG. 17.

The controller 14 executes the determination and correcting operations which will be described below. FIG. 18 is a flowchart of a sequence of logical steps to perform the determination and correcting operations. The same step numbers as employed in FIG. 4 will refer to the same operations.

If a YES answer is obtained in step S10 meaning that the condition for executing the determination and correcting operations has been satisfied, then the routine proceeds to step S30 wherein the detection value Tw, as outputted from the temperature sensor 52, is acquired and analyzed. The detection value Tw represents substantially the same temperature as that of the switching device Sa.

The routine then proceeds to step S14g wherein the number N of the temperature-sensitive diodes SD*# connected together to form the temperature-sensitive diode assembly SDa is determined based on the detection value Tw, as outputted from the temperature sensor 52, and the duty cycle of the output signal from the PWM comparator 28.

This determination is made based on the facts that the detection value Tw, as outputted by the temperature sensor 52, is substantially identical with the actual temperature Tj of the switching device Sa, and the actual temperature Tj of the switching device Sa, the duty cycle of the output signal of the PWM comparator 28, and the number N of the temperature-sensitive diodes SD*# show a given relation to each other. For example, the controller 14 determines the number N of the temperature-sensitive diodes SD*# by look-up using a map, as illustrated in FIG. 18, listing a relation of the number N of the temperature-sensitive diodes SD*# to the duty cycle of the output signal from the PWM comparator 28 and the temperature Tj of the switching device Sa.

The routine proceeds to step S16a wherein the correcting operation is made to correct the duty cycle of the output signal from the PWM comparator 28, as inputted to the controller 14, based on the number N of the temperature-sensitive diodes SD*#, as determined in step S14g. Specifically, the controller 14 brings a value of the duty cycle of the output signal from the PWM comparator 28 into agreement with that expected to be provided when the number N of the temperature-sensitive diodes SD*# is set to the above described specified value (i.e., 3 in this embodiment). In other words, the duty cycle of the output signal from the PWM comparator 28 which has information used in the temperature determining operation executed by the controller 14 is so corrected as to match the number N of the temperature-sensitive diodes SD*#, as determined in step S14g.

Alternatively, if a NO answer is obtained in step S10 or after step S16a, the routine terminates.

As apparent from the above discussion, the controller 14 calculates the number N of the temperature-sensitive diodes SD*# connected together to form the temperature-sensitive diode assembly SDa as a function of the detection value Tw, as outputted from the temperature sensor 52, and the duty cycle of the output signal from the PWM comparator 28 and also correct the duty cycle of the output signal from the PWM comparator 28 as a function of the calculated number N, thereby ensuring the accuracy in determining the temperature of the switching device Sa.

The switching devices S*# installed in the inverter IV and the converter CV are, as described above, all identical with each other in number of the temperature-sensitive diodes SD*# connected together to constitute the temperature-sensitive diode assembly SD*# serving as a temperature sensor for each of the switching devices S*#. The control system of this embodiment is, therefore, engineered to use only one of the temperature-sensitive diode assemblies (i.e., the diode arms) SD*# to calculate the temperature of the switching device Sa as representing those of all the switching devices S*#, thus resulting in a simplified structure or operation of the control system (i.e., the temperature measuring apparatus), as illustrated in FIG. 1. The correcting operation in step S16a is executed by the controller 14 working as a software processor, thus facilitating ease with which a logical structure component used in the correcting operation, such as the map employed in step S14b, is altered.

The eighth embodiment will be described below which is different in the determination operation from the first embodiment.

Figure 19:
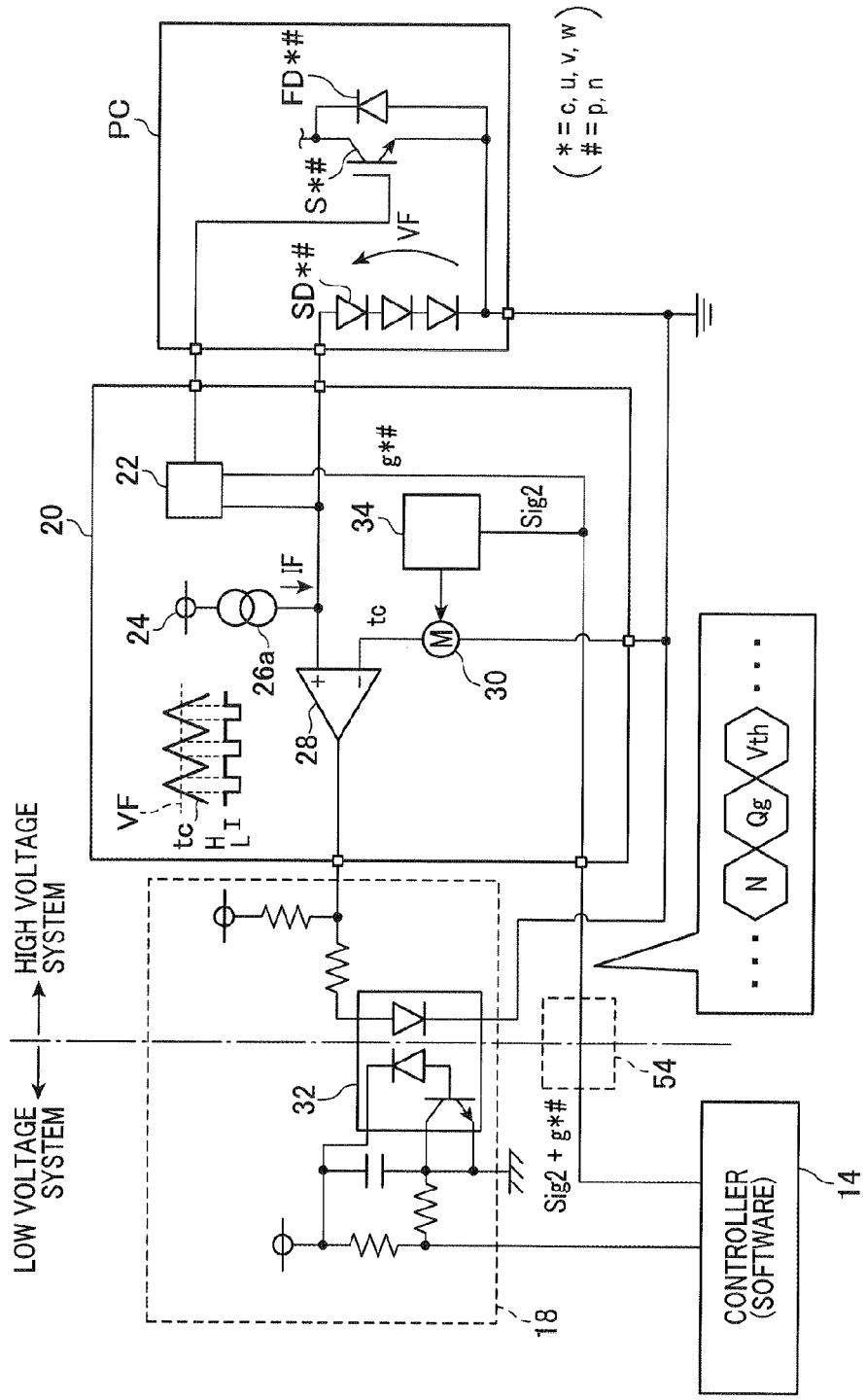
FIG. 19 is a circuit diagram which illustrates a structure of a temperature measuring apparatus according to the eighth embodiment.

FIG. 19 illustrates a structure of the temperature measuring circuit for the switching device S*#. The same reference numbers as employed in FIG. 2 will refer to the same parts.

The controller 14 outputs, as can be seen in the drawing, the drive signal g*# for the switching device S*#. The drive signal g*# is transmitted to the drive controller 22 through a second interface 54. The second interface 54 works as an insulating transmitter to transmit the drive signal g*# for the switching device S*# and is omitted from FIG. 2. The constant-current power source 26a is designed to produce the output current IF which is fixed in level.

The determination circuit 34, like in the first embodiment, executes the determination and correcting operations which will be described below. The determination circuit 34 analyzes an output signal Sig2, as transmitted from the controller 14 through the second interface 54, to determine the number N of the temperature-sensitive diodes SD*# connected together to form the temperature-sensitive diode assembly SDa. Specifically, before activating the switching device S*#, the controller 14 produces the output signal Sig2 which is either at the logic high level or at the logic low level. When determining that the output signal Sig2 is at the high level, the determination circuit 34 decides that the number N of the temperature-sensitive diodes SD*# is two, while when determining that the output signal Sig2 is at the low level, the determination circuit 34 decides that the number N of the temperature-sensitive diodes SD*# is three. In a production process of the controller 14 (i.e., the temperature measuring apparatus of this embodiment), information about the number N of the temperature-sensitive diodes SD*# connected together to form the temperature-sensitive diode assembly SDa installed in the control system is stored in the controller 14. The controller 14 analyzes the stored information and produces the output signal Sig2 logically indicative of the number N of the temperature-sensitive diodes SD*#.

The transmission of the output signal Sig2 through the second interface 54 is achieved by serial communication. The serial communication also transmits individual variability information about the switching devices S*#. For instance, the individual variability information represents gate charges Qg of the switching devices S*# and/or threshold voltages Vth that are gate voltages which induce the switching devices S*# to be turned on. The individual variability information is transmitted to drive controller 22 to compensate for a variation in operation of the switching devices S*# arising from the individual variability thereof.

As apparent from the above discussion, the determination circuit 34 calculates the number N of the temperature-sensitive diodes SD*# connected together to form the temperature-sensitive diode assembly SDa based on the logic level of the output signal Sig2 outputted from the controller 14 through the second interface 54. The second interface 54 is, as described above, used to transmit the output signal Sig2 as well as the drive signals g*# for the switching devices S*#, thus eliminating the need for additional signal transmission path and a photo-coupler to send the output signal Sig2 to the determination circuit 34.

The transmission of signals through the second interface 54 is, as described above, achieved by serial communication, thus enabling the information about the number N of the temperature-sensitive diodes SD*# to be transmitted correctly to the determination circuit 34 even when it is required to send a great deal of information from the controller 14 to the high-voltage system upon start-up of the inverter IV.

The ninth embodiment will be described below which is designed to diagnose the operations of the temperature-sensitive diodes SD*#.

Figure 20:
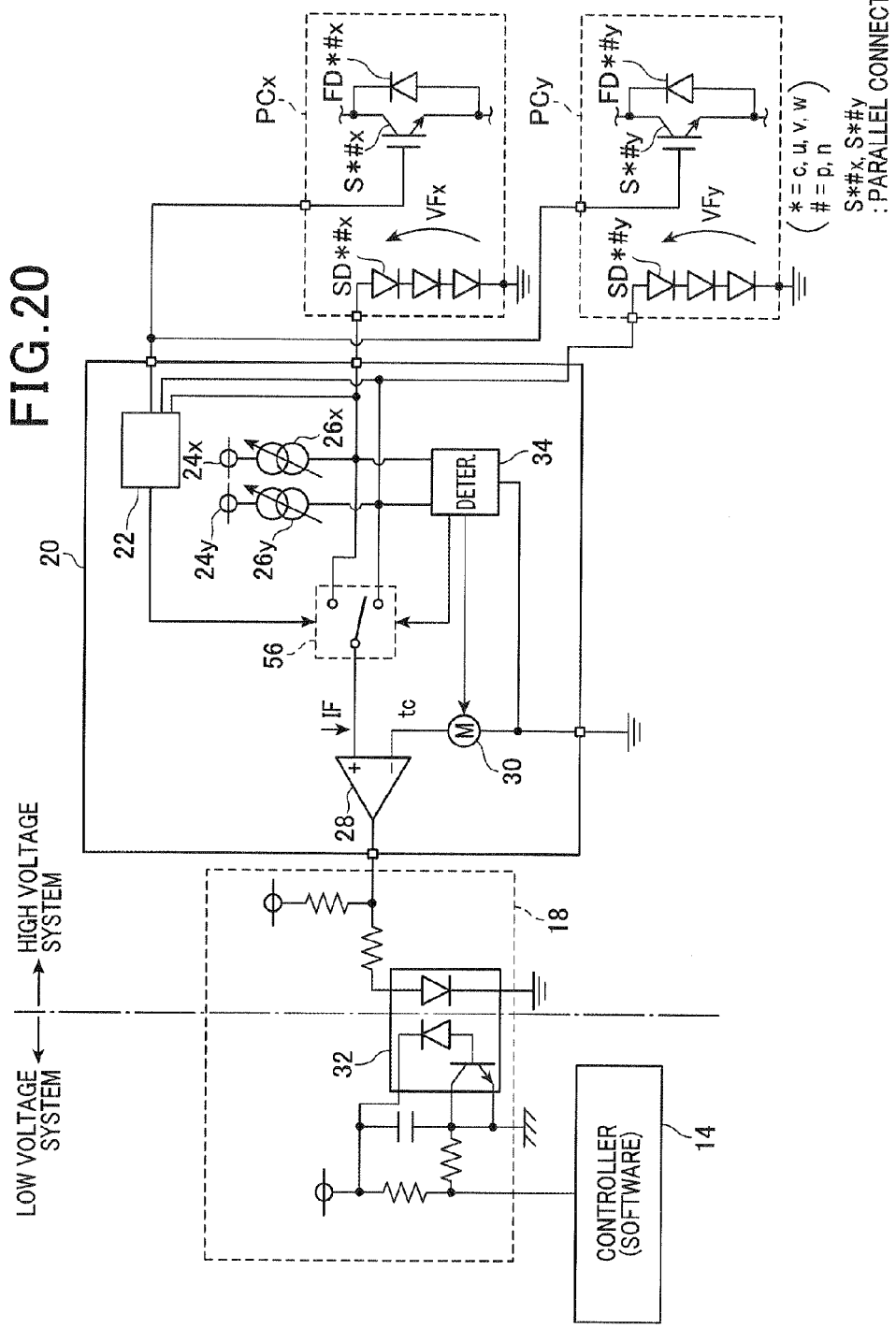
FIG. 20 is a circuit diagram which illustrates a structure of a temperature measuring apparatus according to the ninth embodiment.

FIG. 20 illustrates a structure of the temperature measuring circuit for the switching device S*#. The same reference numbers as employed in FIG. 2 will refer to the same parts.

The integrated circuit 20 is designed to drive adjacent two of the switching devices S*# which are electrically connected in parallel to each other. The two of the switching devices S*# will also be denoted by S*#x and S*#y, respectively. The switching devices S*#x and S*#y are connected at collectors thereof to each other and also connected at emitters thereof to each other. The parallel connection of the switching devices S*#x and S*#y is for increasing maximum values of output current from the converter CV and the inverter IV.

In the following discussion, the switching device S*#x will be referred to as a first switching device. The switching device S*#y will be referred to as a second switching device. The assembly of the temperature-sensitive diodes SD*# provided for the first switching device S*#x will be referred to as a first temperature-sensitive diode assembly SD*#x. Similarly, the assembly of the temperature-sensitive diodes SD*# provided for the second switching device S*#y will be referred to as a second temperature-sensitive diode assembly SD*#y. There are two temperature measuring apparatuses one for each of the first and second switching devices S*#x and S*#y. The temperature measuring apparatuses are substantially identical in structure with the one in the first embodiment. Parts of the temperature measuring apparatus for the first switching device S*#x are denoted by suffix "x". Similarly, parts of the temperature measuring apparatus for the second switching device S*#y are denoted by suffix "y".

The first power source 24x connects with the anode of the first temperature-sensitive diode assembly SD*#x through the first constant-current power source 26x. The first temperature-sensitive diode assembly SD*#x is connected at the cathode thereof to ground. Similarly, the second power source 24y connects with the anode of the second temperature-sensitive diode assembly SD*#y through the second constant-current power source 26y. The second temperature-sensitive diode assembly SD*#y is connected at the cathode thereof to ground.

The switch 56 works to selectively establish an electric connection between the anode of the first temperature-sensitive diode assembly SD*#x and the non-inverting input terminal of the PWM comparator 28 and between the anode of the second temperature-sensitive diode assembly SD*#y and the non-inverting input terminal of the PWM comparator 28. This establishes transmission of both output signals VFx and VFy from the first temperature-sensitive diode assembly SD*#x and the second temperature-sensitive diode assembly SD*#y to the controller 14 through the single interface 18.

Figure 21:
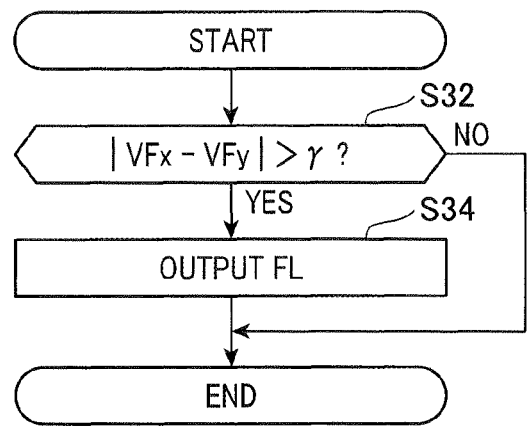
FIG. 21 is a flowchart of a diagnosis program to monitor a malfunction of a temperature-sensitive diodes according to the ninth embodiment.

FIG. 21 is a flowchart of a diagnosis program to monitor a malfunction of the temperature-sensitive diodes SD*#. This program is executed by the determination circuit 34 at a regular interval. The determination circuit 34 is hardware and thus performs the program of FIG. 21 through a logic circuit.

After entering the program, the routine proceeds to step S32 wherein it is determined whether an absolute value of a difference between the output signal VFx from the first temperature-sensitive diode assembly SD*#x and the output signal VFy from the second temperature-sensitive diode assembly SD*#y is greater than a given value y (>0) or not. This determination is made to determine whether either or both of the first temperature-sensitive diode assembly SD*#x and the second temperature-sensitive diode assembly SD*#y are malfunctioning or not. Such a malfunction is caused by at least one of a short or an open in either of the first temperature-sensitive diode assembly SD*#x and the second temperature-sensitive diode assembly SD*#y and a disconnection in an electric path connecting between the first constant-current power source 26x and the anode of the first temperature-sensitive diode assembly SD*#x or between the second constant-current power source 26y and the anode of the second temperature-sensitive diode assembly SD*#y. The diagnosis of the malfunction may be achieved for the following reasons.

The drive controller 22 is shared between the first and second switching devices S*#x and S*#y. This causes the first and second switching devices S*#x and S*#y to be identical in operating condition with each other, meaning that actual temperatures of the first and second switching devices S*#x and S*#y are substantially equal to each other. The output signals VF from the first temperature-sensitive diode assembly SD*#x and the second temperature-sensitive diode assembly SD*#y will, thus, substantially agree with each other, so that the absolute value of a difference therebetween will be very small. The malfunction of at least one of the first temperature-sensitive diode assembly SD*#x and the second temperature-sensitive diode assembly SD*#y, therefore, results in an increase in the absolute value of the difference between the output signals VF from the first temperature-sensitive diode assembly SD*#x and the second temperature-sensitive diode assembly SD*#y. The diagnosis of the first temperature-sensitive diode assembly S*#x and the second temperature-sensitive diode assembly SD*#y may, thus, be achieved by analyzing the above absolute value.

If a YES answer is obtained in step S32 meaning that at least one of the first temperature-sensitive diode assembly SD*#x and the second temperature-sensitive diode assembly SD*#y is malfunctioning, then the routine proceeds to step S34 wherein the determination circuit 34 outputs a fail-safe signal FL to the controller 14. For instance, the determination circuit 34 produces through the PWM comparator 28 the fail-safe signal FL in a pulse form which an output of the PWM comparator 28 never take when the first and second switching devices S*#x and S*#y are operating properly. The controller 14 is responsive to the fail-safe signal FL to warn a user or an operator of the vehicle of the malfunction or instruct an upper controller (e.g., a supervisory controller) of the vehicle to place the vehicle in the so-called limp-home mode.

Alternatively, if a NO answer is obtained in step S32 or after step S34, the routine terminates.

As apparent from the above discussion, the temperature measuring apparatus of this embodiment works to diagnose the first temperature-sensitive diode assembly SD*#x and the second temperature-sensitive diode assembly SD*#y and places the control system in the fail-safe mode when either of the first temperature-sensitive diode assembly SD*#x or the second temperature-sensitive diode assembly SD*#y is determined to be malfunctioning. This prevents the control system for the motor-generator 10 from continuing to run when either of the first temperature-sensitive diode assembly SD*#x or the second temperature-sensitive diode assembly SD*#y is malfunctioning, thus ensuring the reliability in operation of the inverter IV and the converter CV.

The tenth embodiment will be described below which is different in how to diagnose the temperature-sensitive diode assemblies SD*# from the ninth embodiment. Specifically, the controller 14 is designed to perform such diagnosis.

The control system of this embodiment, like in the first embodiment, the eight switching devices S*# which are, however, not connected in parallel to each other, that is, connected in series with each other. The temperature measuring apparatus has substantially the same structure as the one in FIG. 2 for each of the switching devices S*#. Specifically, the PWM comparator 28, the carrier generating circuit 30, and the interface 18 connecting with the PWM comparator 28 are provided for each of the switching devices S*#. Information about the temperature of each of the switching devices S*# is transmitted to the controller 14 through a corresponding one of the interfaces 18.

Figure 22:
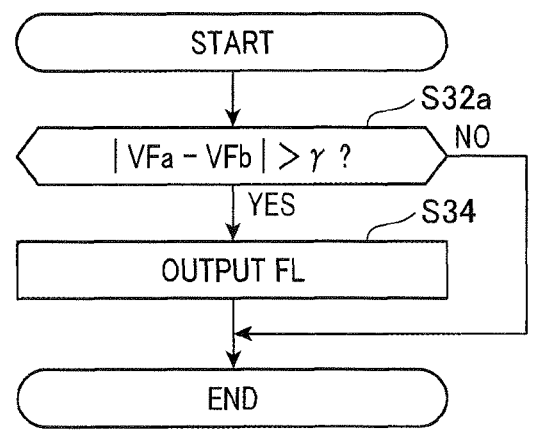
FIG. 22 is a flowchart of a diagnosis program to monitor a malfunction of a temperature-sensitive diodes according to the tenth embodiment.

FIG. 22 is a flowchart of a diagnosis program to monitor a malfunction of the temperature-sensitive diodes SD*#. This program is executed by the controller 14 at a regular interval.

After entering the program, the routine proceeds to step S32a wherein it is determined whether an absolute value of a difference between output signals VFa and VFb (i.e., VFa−VFb) which have been outputted from each of all possible combinations of two of the temperature-sensitive diode assembles SD*# provided for eight switching devices S*# is greater than a given value y (>0) or not. This determination is made to determine whether any of the temperature-sensitive diode assemblies SD*# is malfunctioning or not.

If a YES answer is obtained in step S32a meaning that at least one of all the absolute values of the differences (VFa–VFb) is greater than given value y, that is, either of corresponding two of the temperature-sensitive diode assemblies SD*# is malfunctioning, then the routine proceeds to step S34 wherein the determination circuit 34, like in the ninth embodiment of FIG. 21, outputs the fail-safe signal FL to the controller 14. The controller 14 is responsive to the fail-safe signal FL to warn a user or an operator of the vehicle of the malfunction or instruct an upper controller such as a supervisory controller of the vehicle to place the vehicle in the so-called limp-home mode.

Alternatively, if a NO answer is obtained in step S32a or after step S34, the routine terminates.

As apparent from the above discussion, the temperature measuring apparatus of this embodiment is engineered to have at least two switching devices (i.e., the switching devices S*#) connected in series with each other as a low potential side switching device and a high potential side switching device which constitute the inverter IV and the converter CV working as an electric power converter. When an absolute value of a difference in temperature between the low potential side switching device and the high potential side switching device is greater than a given value, it is determined that a malfunction associated with either of corresponding two of the temperature-sensitive diode assemblies SD*# is occurring.

The eleventh embodiment will be described below which is different in how to diagnose the temperature-sensitive diode assemblies SD*# from the tenth embodiment. Specifically, the controller 14 is designed to perform such diagnosis. The control system of this embodiment is equipped with a low voltage side temperature sensor 52, like in the seventh embodiment, which works to measure the temperature of coolant flowing through a cooler to cool the inverter IV and the converter CV. The temperature sensor 52 outputs the detection value Tw indicative of the temperature of the coolant to the controller 14. The temperature of the coolant is positively correlated with the temperature of the switching devices S*#.

FIG. 23 is a flowchart of a diagnosis program to monitor a malfunction of the temperature-sensitive diodes SD*#. This program is executed by the controller 14 at a regular interval.

After entering the program, the routine proceeds to step S30 wherein the detection value Tw, as outputted from the temperature sensor 52, is acquired and analyzed.

The routine proceeds to step S38 wherein a judging temperature Tth is determined as a function of the detection value Tw, as outputted from the temperature sensor 52. The judging temperature Tth is set to the temperature of the switching devices S*# which depends upon an operating condition of the inverter IV, etc. The operating condition of the inverter IV, the detection value Tw from the temperature sensor 52, and the temperature of the switching devices S*# are correlated to each other. The determination of the judging temperature Tth in step S38 is, thus, achieved by look-up using a table or map listing a relation of the judging temperature Tth to the detection value Tw from the temperature sensor 52.

The routine proceeds to step S40 wherein it is determined whether an absolute value of a difference between at least one of temperature detection values Td and the judging temperature Tth is greater than a threshold value δ or not. The temperature detection value Td is calculated in the temperature measuring apparatus based on the output signal VF from each of the temperature-sensitive diode assemblies SD*# as indicating, as described above, the temperature Td of a corresponding one of the switching devices S*#. The determination in step S40 is made to check whether any of the temperature-sensitive diode assemblies SD*# is malfunctioning or not. Such a determination is based on the fact that when the temperature-sensitive diode assembly SD*# is operating properly, the difference between the temperature detection value Td and the judging temperature Tth will be very small, while when the temperature-sensitive diode assembly SD*# is malfunctioning, the difference will be increased.

If a YES answer is obtained in step S40, then the routine proceeds to step S34 wherein the determination circuit 34, like in the ninth embodiment of FIG. 21, outputs the fail-safe signal FL to the controller 14. The controller 14 is responsive to the fail-safe signal FL to warn a user or an operator of the vehicle of the malfunction or instruct an upper controller such as a supervisory controller of the vehicle to place the vehicle in the so-called limp-home mode.

Alternatively, if a NO answer is obtained in step S40 or after step S34, the routine terminates.

The above embodiments may be modified in the following manners.

The controller 14, as described above, calculates the temperature Td of the switching device S*# using the temperature map which holds characteristic information about the relation of the temperature Td of the switching device S*# to the duty cycle of the pulse signal outputted from the PWM comparator 28, however, the temperature map may alternatively be created about a mathematical equation in which the duty cycle of the output from the PWM comparator 28 is expressed by an independent variable, and the temperature Td of the switching device S*# is expressed by a dependent variable.

The determination of the number N of the temperature-sensitive diodes SD*# connected together to make the temperature-sensitive diode assembly SDa may alternatively be achieved by changing the value of current supplied from the constant-current power source 26 to the temperature-sensitive diode assembly SDa, in sequence, to three or more different values to derive a plurality of resulting values of the judging potential difference ΔVjde. The number N is determined based on an average of the values of the judging potential difference ΔVjde.

The switch 36 in the third embodiment is already fixed in position thereof in the production process of the temperature measuring apparatus, but may be designed to be operated manually by, for example, a user of the control system.

The external signal Sig used in the third embodiment is, as described above, either at the logic high level or at the logic low level, but alternatively be created to hold information about the number N of the temperature-sensitive diodes SD*# in the form of a frequency or a pulse width.

The temperature sensor 42 in the fourth embodiment works to measure the temperature of the integrated circuit 20, but may alternatively be engineered to measure the temperature of a surface of a circuit board on which the integrated circuit 20 is mounted and output a signal indicative thereof to a component of the high-voltage system (e.g., the drive controller 22).

Alternatively, a temperature sensor may be used which measures the temperature of the coolant, as described above, the temperature of the smoothing capacitor C or the reactor L of the converter CV, or the temperature of a component(s) installed in the power control unit (PCU) and outputs a temperature signal indicative thereof to the controller 14 of the low-voltage system. The controller 14 transmits the temperature signal, as inputted thereto, to the determination circuit 34 of the high-voltage system through, for example, an electric path connecting between the low-voltage system and the high-voltage system.

The external signal Sig may be made to have three different logic values. This enables three types of assemblies of the temperature-sensitive diodes SD*# which are different in number N of the temperature-sensitive diodes SD*# to be discriminated from each other.

The low-voltage side temperature sensor 52 employed in the seventh embodiment may alternatively be designed to measure the temperature of the integrated circuit 20, the circuit board on which the integrated circuit 20 is fabricated, the smoothing capacitor C, or the reactor L of the converter CV.

The output signal Sig2 may be created to hold information about the number N of the temperature-sensitive diodes SD*# in the form of a frequency or a pulse width.

In the eighth embodiment, as illustrated in FIG. 19, the drive signal g*# for the switching device S*# and the output signal Sig2 are transmitted to the integrated circuit 20 through the second interface 54, however, may be sent to the integrated circuit 20 through two separate interfaces, respectively.

The inverter IV and the converter CV may be different from each other in number N of the temperature-sensitive diodes SD*# connected together. For instance, assemblies each made up of the three or more temperature-sensitive diodes SD*# may be used in either of the inverter IV or the converter CV.

In the ninth embodiment, the diagnosis program of FIG. 21 to monitor a malfunction of the temperature-sensitive diodes SD*# may be executed by the controller 14 instead of the determination circuit 34. When receiving the fail-safe signal FL, the controller 14 warns the operator of the vehicle of the malfunction or instructs the upper controller of the vehicle to place the vehicle in the so-called limp-home mode.

In the ninth embodiment, the diagnosis program may optionally be executed only before the switching devices S*# are activated and the determination operation is started.

The ninth embodiment, as described above, employs parallel-connected two of the switching devices S*# with which the integrated circuit 20 is connected, however, parallel-connected three or more of the switching devices S*# may be selected as having the temperature-sensitive diode assemblies SD*# to be diagnosed in operation. When an absolute value of a difference between the output signals VF from at least two of the three or more temperature-sensitive diode assemblies SD*# is greater than the given value y, the determination circuit 34 decides that any of the temperature-sensitive diode assemblies SD*# is malfunctioning.

In the ninth embodiment, the judging temperature Tth is determined as a function of the detection value Tw, as outputted from the temperature sensor 52, however, may alternatively be calculated as a function of at least one of the temperature of the coolant in the cooler, the ambient temperature of a circuit board on which the integrated circuit 20 is fabricated, the ambient temperature of the power control unit PCU, the temperature of the smoothing capacitor C, and the temperature of the reactor L. It is, however, advisable that the judging temperature Tth be determined only as a function of the temperature of the coolant.

In the seventh embodiment, the controller 14 executes the correcting operation to correct the duty cycle of the output signal from the PWM comparator 28 based on the number N of the temperature-sensitive diodes SD*#, however, it may be designed to have a plurality of maps which list a relation between the duty cycle of the output signal from the PWM comparator 28 and the temperature of the switching device Sa in units of the number N of the temperature-sensitive diodes SD*# and select one of the maps which corresponds to the number N, as determined in step S14g.

Each of the first to sixth embodiment may be designed to transmit information about the number N of the temperature-sensitive diodes SD*#, as derived in the determination circuit 34, to the controller 14 and to execute the correcting operation, as discussed in the seventh embodiment, in the controller 14.

The control system (i.e., the temperature measuring apparatus) is described in the first embodiment as including the high-voltage system (i.e., the first system) and the low-voltage system (i.e., the second system), as illustrated in FIG. 2, however, the control system may be engineered to measure the temperature of a component part(s) of the low-voltage system defined as the first system and transmit information about it to the high-voltage system defined as the second system.

The insulating transmitter, as described above, be equipped with a magnetically insulating device such as a pulse transformer as well as an optical insulating device such as a photocoupler.

The modulation of the output signal VF from the temperature-sensitive diode assembly SD*# is, as described above, achieved with the triangle wave signal tc, however, may alternatively be made using a sawtooth wave signal.

The PWM comparator 28, as described above, works as a modulator to modulate the pulse width of the output signal VF, however, a frequency modulation circuit may be employed which modulates the output signal VF to produce a pulse signal whose frequency increases with an increase in temperature of the switching devices S*# (see Japanese Patent First Publication No. 2009-171312, as discussed in the introductory part of this application). In this case, the pulse signal, as produced by the frequency modulation circuit, is transmitted to the controller 14 through the interface 18. The controller 14 then calculates the temperature Td of the switching devices S*# as being higher with a decrease in width of the pulse signal. The controller 14 uses a map which holds the characteristic information representing, as a plus signal characteristic, a relation between the width of the pulse signal and the temperature of the switching devices S*#. This system also ensures the accuracy in determining the temperature of the switching devices S*#.

The assembly of temperature-sensitive diodes SD*# connected together is used as a sensing device to measure the temperature of a target object (i.e., the switching device S*#), however, the sensing device may be implemented by a resistance thermometer (also called a resistance temperature detector). When employed in the structure of the first embodiment, the resistance thermometer is joined at an end thereof to the output terminal of the constant-current power source 26 and at the other end thereof to ground. The resistance thermometer works to produce a signal (i.e., a voltage drop) which is corrected with the temperature of the switching device S*#. The voltage drop increases with a rise in temperature of the switching device S*#.

The sensing device may alternatively be implemented by a metal-oxide semiconductor field-effect transistor (MOSFET). When the current is applied through the source and the drain of the MOSFET, the voltage developed between the source and the drain will depend upon the temperature of the switching device S*#.

The switching devices S*# that are target objects to be measured in temperature by the temperature measuring apparatus are, as described above, made of an insulated gate bipolar transistor (IGBT), however may alternatively implemented by a power MOS field-effect transistor. The temperature measuring apparatus, as described in the above embodiments, may alternatively be designed to measure the temperature of a target object other than a switching device, like used in the inverter IV or the converter CV.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A temperature measuring apparatus comprising:
sensing devices which output a signal correlating with a temperature of a given temperature-sensed object;
modulating means for modulating the output signal from said sensing devices into a pulse signal and outputting it;
temperature detecting means for detecting the temperature of the temperature-sensed object based on the pulse signal outputted from the modulating means;
determining means for determining the connected number of the sensing devices; and
correcting means for correcting information used in temperature detection in the temperature detecting means to be what corresponds to the connected number, as determined by said determining means.

2. A temperature measuring apparatus as set forth in claim 1, wherein said determining means includes acquiring means for acquiring an external signal including information about the connected number of the sensing devices, and in that the determining means determines the connected number based on the external signal obtained by said acquiring means.

3. A temperature measuring apparatus as set forth in claim 1, further comprising acquiring means for acquiring a detected value about detecting means for detecting a temperature of a second temperature-sensed object having a correlation with the temperature of said temperature-sensed object, and in that said determining means determines the connected number based on the detected value of said detecting means, as acquired by said acquiring means, and the output signal of the sensing devices.

4. A temperature measuring apparatus as set forth in claim 1, wherein the determining means determines the connected number based on the output signal from all the sensing devices connected and an output from one of the sensing devices.

5. A temperature measuring apparatus as set forth in claim 1, wherein said sensing devices are temperature-sensitive diodes, in that it further comprises voltage applying means which is capable of variably setting voltage applied to the sensing devices, and in that the determining means determines the connected number based on the applied voltage when said voltage applying means varies the voltage applied to the sensing devices to turn on the sensing devices.

6. A temperature measuring apparatus as set forth in claim 1, wherein the modulating means works to pulse-width modulate the output signal of the sensing devices based on a magnitude comparison between the output signal from the sensing devices and a carrier and output it, in that the temperature determining means determines the temperature of the temperature-sensed object based on characteristic information representing a relation between a duty cycle of the output signal of the modulating means and the temperature of the temperature-sensed object when the connected number is set to a given value, and in that the correcting means performs said correcting process by correcting an amplitude of the carrier to bring the duty cycle of the output signal of the modulating means into agreement with the duty cycle of the output signal of the modulating means when the connected number is the given value based on the connected number, as determined by said determining means.

7. A temperature measuring apparatus as set forth in claim 1, wherein the temperature-sensed object is a switching device, and in that the determining means determines the connected number before the switching device is driven.

8. A temperature measuring apparatus as set forth in claim 1, wherein the temperature-sensed object is a plurality of switching devices connected in parallel to each other, and in that it further comprises failure determining means for determining that a failure of the sensing devices is occurring based on a determination that an absolute value of a temperature difference between a pair of the switching devices has exceeded a given value.

9. A temperature measuring apparatus as set forth in claim 1, wherein the temperature-sensed object is a high potential side switching device and a low potential side switching device which are connected in series to constitute an electric power convertor, and in that it further comprises failure determining means for determining that a failure of the sensing devices is occurring based on a determination that an absolute value of a temperature difference between a pair of the switching devices constituting the electric power converter has exceeded a given value.

10. A temperature measuring apparatus as set forth in claim 1, wherein the temperature-sensed object is a switching device, in that it further comprises means for acquiring a detected value about detecting means for detecting a temperature of a second temperature-sensed object having a correlation with the temperature of said temperature-sensed object, and in that it further comprises failure determining means for determining that a failure of the sensing devices is occurring based on the output signal of said sensing devices and the acquired detected value of the detecting means.

11. A temperature measuring apparatus as set forth in any claim 1, further comprising means for warning of the failure when said failure determining means determines that the failure is occurring.

12. A temperature measuring apparatus as set forth in claim 1, wherein the sensing devices are temperature-sensitive diodes.

13. A temperature measuring apparatus as set forth in claim 1, further comprising constant-current distributing means for distributing a constant current to the sensing devices, and in that the determining means determines the connected number based on the output signal of said sensing devices when said constant-current distributing means distributes the constant current.

14. A temperature measuring apparatus as set forth in claim 13, wherein the constant-current distributing means is capable of varying the constant current supplied to the sensing devices, and in that the determining means determines the connected number based on a change in the output signal of the sensing devices when said constant-current distributing means changes the constant-current.

15. A temperature measuring apparatus as set forth in claim 1, wherein the temperature determining means determines the temperature of the temperature-sensed object based on characteristic information and a characteristic value of the output signal, the characteristic information representing a relation between the characteristic value of the output signal of said modulating means and the temperature of the temperature-sensed object when the connected number is set to a given value, and in that the correcting means performs said correcting process by correcting the characteristic value of the output signal of the modulating means inputted into the temperature detecting means into agreement with the characteristic value of the output signal of the modulating means when the connected number is the given value based on the connected number, as determined by said determining means.

16. A temperature measuring apparatus as set forth in claim 15, wherein the temperature-sensed object is plural, in that the sensing devices are provided in correspondence to the respective temperature-sensed objects, in that the connected numbers of the respective sensing devices are identical with each other, and in that the determining means determines the connected number of one of the sensing devices.

17. A temperature measuring apparatus as set forth in claim 1, wherein the temperature-sensed object, the sensing devices, the modulating means, the determining means, and the correcting means are installed in a first region, in that it further comprises outputting means for outputting a signal including information about the connected number of the sensing devices and insulating transmitting means, the outputting means being installed in a second region electrically isolated from the first region, the insulating transmitting means working to establish transmission of the signal between the first region and the second region while electrically insulating between the first and second regions, and in that the determining means determines the connected number based on the signal, as transmitted through the insulating transmitting means.

18. A temperature measuring apparatus as set forth in claim 17, wherein the temperature-sensed object is a switching device, and in that the insulating transmitting means is designed to transmit both a drive signal to the switching device and the output signal of the outputting means.

19. A temperature measuring apparatus as set forth in claim 17, wherein the insulating transmitting means establishes the transmission of the signal through serial communication.

* * * * *